(12) United States Patent
Hiate et al.

(10) Patent No.: US 11,817,272 B2
(45) Date of Patent: Nov. 14, 2023

(54) METALLIZED FILM, METALLIZED FILM ROLL, PLATE ROLL

(71) Applicant: OJI HOLDINGS CORPORATION, Tokyo (JP)

(72) Inventors: Kazuyuki Hiate, Tokyo (JP); Akihiro Kakehi, Tokyo (JP); Katsuyuki Moritaka, Tokyo (JP); Yoshikazu Fujishiro, Tokyo (JP); Masahiro Nakata, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 711 days.

(21) Appl. No.: 16/638,794

(22) PCT Filed: Aug. 14, 2018

(86) PCT No.: PCT/JP2018/030296
§ 371 (c)(1),
(2) Date: Feb. 13, 2020

(87) PCT Pub. No.: WO2019/035457
PCT Pub. Date: Feb. 21, 2019

(65) Prior Publication Data
US 2021/0134531 A1 May 6, 2021

(30) Foreign Application Priority Data
Aug. 15, 2017 (JP) ................. 2017-156853

(51) Int. Cl.
*H01G 4/32* (2006.01)
*H01G 4/008* (2006.01)
(Continued)

(52) U.S. Cl.
CPC ............. *H01G 4/32* (2013.01); *H01G 4/008* (2013.01); *H01G 4/012* (2013.01); *H01G 4/385* (2013.01)

(58) Field of Classification Search
CPC .......... H01G 4/32; H01G 4/008; H01G 4/012; H01G 4/385; H01G 4/005; H01G 4/0085
(Continued)

(56) References Cited

U.S. PATENT DOCUMENTS 5,905,628 A * 5/1999 Okuno ................... H01G 4/012
29/25.42
5,942,283 A 8/1999 Okuno et al.
(Continued)

FOREIGN PATENT DOCUMENTS

CN 1175068 A 3/1998
CN 2879375 Y 3/2007
(Continued)

OTHER PUBLICATIONS

International Search Report for PCT/JP2018/030296 dated Oct. 30, 2018 [PCT/ISA/210].
(Continued)

*Primary Examiner* — Arun Ramaswamy
(74) *Attorney, Agent, or Firm* — Sughrue Mion, PLLC

(57) ABSTRACT

In a metallized film 1, n electrode portions 20, which are metal deposition portions, are formed in parallel on one surface of a dielectric film 2 having a film width corresponding to n capacitor elements, n being an even number of 2 or more. Each electrode portion 20 is provided with a plurality of inclined margins 31 and 32, which are metal non-deposition portions extending at an angle with respect to a film width direction, at a regular interval in a film length direction. Across a center line Lc virtually extending in the film length direction at the center in the film width direction, (Continued)

the inclined margins 31 of the electrode portion 20 located on one side in the film width direction, and the inclined margins 32 of the electrode portion 20 located on the other side in the film width direction are inclined in opposite directions so as to be line-symmetric with respect to the center line Lc.

11 Claims, 14 Drawing Sheets

(51) Int. Cl.
  *H01G 4/012* (2006.01)
  *H01G 4/38* (2006.01)
(58) Field of Classification Search
  USPC .................................. 361/301.4, 301.5, 303
  See application file for complete search history.

(56) References Cited

U.S. PATENT DOCUMENTS

| | | | | |
|---|---|---|---|---|
| 6,040,038 | A * | 3/2000 | Momose | H01G 4/015 |
| | | | | 428/209 |
| 6,048,402 | A | 4/2000 | Okuno et al. | |
| 6,370,008 | B1 * | 4/2002 | Vetter | H01G 4/015 |
| | | | | 361/290 |
| 6,631,068 | B1 * | 10/2003 | Lobo | H01G 4/015 |
| | | | | 361/303 |
| 7,933,111 | B2 * | 4/2011 | Yang | H01G 2/16 |
| | | | | 361/311 |
| 2012/0002346 | A1 | 1/2012 | Takagaki | |
| 2014/0301019 | A1 * | 10/2014 | Zhu | H01G 4/012 |
| | | | | 361/303 |
| 2015/0162130 | A1 | 6/2015 | Hirota | |

FOREIGN PATENT DOCUMENTS

| | | |
|---|---|---|
| CN | 101051564 A | 10/2007 |
| CN | 103177870 A | 6/2013 |
| EP | 0 447 550 A1 | 9/1991 |
| GB | 2298962 A | 9/1996 |
| JP | S58-188123 A | 11/1983 |
| JP | 59-151923 A | 8/1984 |
| JP | H02-263419 A | 10/1990 |
| JP | H03-079013 A | 4/1991 |
| JP | 3-178911 A | 8/1991 |
| JP | H09-270359 A | 10/1997 |
| JP | H10-308323 A | 11/1998 |
| JP | H11-026275 A | 1/1999 |
| JP | 2004-087648 A | 3/2004 |
| JP | 2004-095605 A | 3/2004 |
| JP | 2005-026374 A | 1/2005 |
| JP | 2005-191463 A | 7/2005 |
| JP | 2008-124245 A | 5/2008 |
| JP | 2009-170685 A | 7/2009 |
| JP | 2010-182848 A | 8/2010 |
| JP | 2010-272580 A | 12/2010 |
| JP | 2012-92392 A | 5/2012 |
| JP | 5294123 B2 | 9/2013 |
| JP | 2019-036703 A | 3/2019 |

OTHER PUBLICATIONS

Office Action dated Jul. 26, 2021 from the Chinese Patent Office in Chinese Application No. 201880052890.7.
Office Action dated Dec. 14, 2021 in Japanese Application No. 2019-536780.
Extended European Search Report dated Apr. 28, 2021 issued by European Patent Office in Application No. 18845573.7.

* cited by examiner

METALLIZED FILM, METALLIZED FILM ROLL, PLATE ROLL

CROSS-REFERENCE OF RELATED APPLICATION

This application is a National Stage of International Application No. PCT/JP2018/030296 filed Aug. 14, 2018, claiming priority based on Japanese Patent Application No. 2017-156853 filed Aug. 15, 2017, the disclosures of which are incorporated herein by reference in their entirety.

TECHNICAL FIELD

The present invention relates to a metallized film used for a metallized film capacitor, a metallized film roll obtained by winding the metallized film, and a plate roll used to produce the metallized film.

BACKGROUND ART

PTL 1 discloses a metallized film capacitor obtained by winding a metallized film on which a metal deposition electrode is formed.

CITATION LIST

Patent Literature

PTL 1: JP2005-26374A

SUMMARY OF INVENTION

Technical Problem

Some metallized films having a film width corresponding to one capacitor element (hereinafter referred to as "one-element width," as appropriate) used to produce metallized film capacitors are produced by cutting a metallized film having a film width corresponding to multiple capacitor elements (hereinafter referred to as "multiple-element width," as appropriate) into metallized films having a film width corresponding to one capacitor element.

In recent years, there has been a demand to reduce the thickness of dielectric films used to produce metallized film capacitors, in order to reduce the weight and size of the capacitors. However, when the thickness of a dielectric film is reduced in a metallized film having a multiple-element width, margins in the film length direction of the metal deposition electrode tend to cause the formation of steps (step formation) on the body surface of a metallized film roll obtained (rolled) by winding the produced metallized film in a roll shape. Since the metallized film in the stepped portions is stretched, problems may occur in the subsequent capacitor production process.

An object of the present invention is to achieve thickness reduction and suppress step formation in a metallized film having a multiple-element width and a metallized film roll. Another object of the present invention is to provide a plate roll used to produce a metallized film having a multiple-element width.

Solution to Problem

As a result of intensive studies, the present inventors found that the above objects can be achieved by the means described below. Thus, the present invention has been completed.

Specifically, the present invention includes the following preferable embodiments.

[1] A metallized film in which n electrode portions, which are metal deposition portions, are formed in parallel on at least one surface of a dielectric film having a film width corresponding to n capacitor elements, n being an even number of 2 or more;
wherein each electrode portion is provided with a plurality of inclined margins, which are metal non-deposition portions extending at an angle with respect to a film width direction, at a regular interval in a film length direction, and
across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

[2] The metallized film according to [1], wherein each electrode portion is provided with a vertical margin, which is a metal non-deposition portion extending in the film length direction of the dielectric film,
each electrode portion is divided by the vertical margin into a first electrode portion and a second electrode portion in the film width direction,
the first electrode portion is provided with, as the inclined margins, first inclined margins extending at a first angle with respect to the film width direction at a first interval in the film length direction,
the second electrode portion is provided with, as the inclined margins, second inclined margins extending at a second angle with respect to the film width direction at a second interval in the film length direction,
the second interval is less than the first interval, and
the second angle is less than the first angle.

[3] The metallized film according to [2], wherein the vertical margin is staggered in the film width direction for every predetermined length so as not to be in a straight line in the film length direction.

[4] The metallized film according to [1], wherein each electrode portion is provided with first, second, and third vertical margins, which are metal non-deposition portions extending in the film length direction of the dielectric film, spaced apart in the film width direction,
each electrode portion is divided by the first, second, and third vertical margins into first, second, third, and fourth electrode portions in the film width direction,
the first electrode portion is provided with, as the inclined margins, first inclined margins extending at a first angle with respect to the film width direction at a first interval in the film length direction,
the second electrode portion is provided with, as the inclined margins, second inclined margins extending at a second angle with respect to the film width direction at a second interval in the film length direction,
the third electrode portion is provided with, as the inclined margins, third inclined margins extending at the first angle with respect to the film width direction at the first interval in the film length direction,
the fourth electrode portion is provided with, as the inclined margins, fourth inclined margins extending at the second angle with respect to the film width direction at the second interval in the film length direction,
the second interval is less than the first interval, and
the second angle is less than the first angle.

[5] The metallized film according to [4], wherein the vertical margins are each staggered in the film width direction for every predetermined length so as not to be in a straight line in the film length direction.

[6] A metallized film in which an electrode portion, which is a metal deposition portion, is formed on at least one surface of a dielectric film having a film width corresponding to one capacitor element,
wherein the electrode portion is provided with a vertical margin, which is a metal non-deposition portion extending in a film length direction of the dielectric film,
the electrode portion is divided by the vertical margin into a first electrode portion and a second electrode portion in a film width direction,
the first electrode portion is provided with first inclined margins, which are metal non-deposition portions extending at a first angle with respect to the film width direction, at a first interval in the film length direction,
the second electrode portion is provided with second inclined margins, which are metal non-deposition portions extending at a second angle with respect to the film width direction, at a second interval in the film length direction,
the second interval is less than the first interval, and
the second angle is less than the first angle.

[7] The metallized film according to [6], wherein the vertical margin is staggered in the film width direction for every predetermined length so as not to be in a straight line in the film length direction.

[8] A metallized film in which an electrode portion, which is a metal deposition portion, is formed on at least one surface of a dielectric film having a film width corresponding to one capacitor element,
wherein the electrode portion is provided with first, second, and third vertical margins, which are metal non-deposition portions extending in a film length direction of the dielectric film, spaced apart in the film width direction,
the electrode portion is divided by the first, second, and third vertical margins into first, second, third, and fourth electrode portions in the film width direction,
the first electrode portion is provided with first inclined margins, which are metal non-deposition portions extending at a first angle with respect to the film width direction, at a first interval in the film length direction,
the second electrode portion is provided with second inclined margins, which are metal non-deposition portions extending at a second angle with respect to the film width direction, at a second interval in the film length direction,
the third electrode portion is provided with third inclined margins, which are metal non-deposition portions extending at the first angle with respect to the film width direction, at the first interval in the film length direction,
the fourth electrode portion is provided with fourth inclined margins, which are metal non-deposition portions extending at the second angle with respect to the film width direction, at the second interval in the film length direction,
the second interval is less than the first interval, and
the second angle is less than the first angle.

[9] The metallized film according to [8], wherein the vertical margins are each staggered in the film width direction for every predetermined length so as not to be in a straight line in the film length direction.

[10] A metallized film roll comprising the metallized film according to any one of [1] to [9] in a roll shape.

[11] A plate roll used to form an oil mask for forming metal non-deposition portions in a metallized film in which n electrode portions, which are metal deposition portions, are formed in parallel on at least one surface of a dielectric film having a film width corresponding to n capacitor elements, n being an even number of 2 or more,
wherein the metal non-deposition portions are a plurality of inclined margins that extend at an angle with respect to a film width direction in each electrode portion, and that are provided at a regular interval in a film length direction,
across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line,
the plate roll has an outer peripheral surface provided with letterpress portions for forming an oil mask for the plurality of inclined margins at an interval in a circumferential direction, and
the letterpress portions are provided so as to be symmetric from the center in a roll width direction toward left and right ends.

[12] A metallized film in which n electrode portions, which are metal deposition portions, are formed in parallel on one surface of a dielectric film having a film width corresponding to n capacitor elements, n being an even number of 2 or more, and a metal layer is provided on the entire other surface different from the one surface of the dielectric film;
wherein each electrode portion is provided with a plurality of inclined margins, which are metal non-deposition portions extending at an angle with respect to a film width direction, at a regular interval in a film length direction, and
across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

[13] A metallized film in which n electrode portions, which are metal deposition portions, are formed in parallel on one surface of a dielectric film having a film width corresponding to n capacitor elements, n being an even number of 2 or more, and a metal layer is provided on the entire other surface, other than insulation margins, different from the one surface of the dielectric film;
wherein each electrode portion is provided with a plurality of inclined margins, which are metal non-deposition portions extending at an angle with respect to a film width direction, at a regular interval in a film length direction, and
across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

[14] A metallized film in which n electrode portions, which are metal deposition portions, are formed in parallel on both surfaces of a dielectric film having a film width corresponding to n capacitor elements, n being an even number of 2 or more;

wherein each electrode portion on both surfaces of the dielectric film is provided with a plurality of inclined margins, which are metal non-deposition portions extending at an angle with respect to a film width direction, at a regular interval in a film length direction, and across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

[15] A metallized film in which n electrode portions, which are metal deposition portions, are formed in parallel on one surface of a dielectric film having a film width corresponding to n capacitor elements, n being an even number of 2 or more, and electrode portions having a shape different from that of the n electrode portions are formed on the other surface different from the one surface of the dielectric film;

wherein each electrode portion of the one surface is provided with a plurality of inclined margins, which are metal non-deposition portions extending at an angle with respect to a film width direction, at a regular interval in a film length direction, and across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

[16] A metallized film in which n electrode portions, which are metal deposition portions, are formed in parallel on one surface of a dielectric film having a film width corresponding to n capacitor elements, n being an even number of 2 or more, and metal is not deposited on the other surface different from the one surface of the dielectric film;

wherein each electrode portion is provided with a plurality of inclined margins, which are metal non-deposition portions extending at an angle with respect to a film width direction, at a regular interval in a film length direction, and across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

Advantageous Effects of Invention

The present invention can achieve thickness reduction and suppress step formation in a metallized film having a multiple-element width.

DESCRIPTION OF EMBODIMENTS

Embodiments of the metallized film according to the present invention and the plate roll used to produce the film are described below with reference to the attached drawings.

Embodiment 1

1. Structure of Metallized Film

Figure 1:
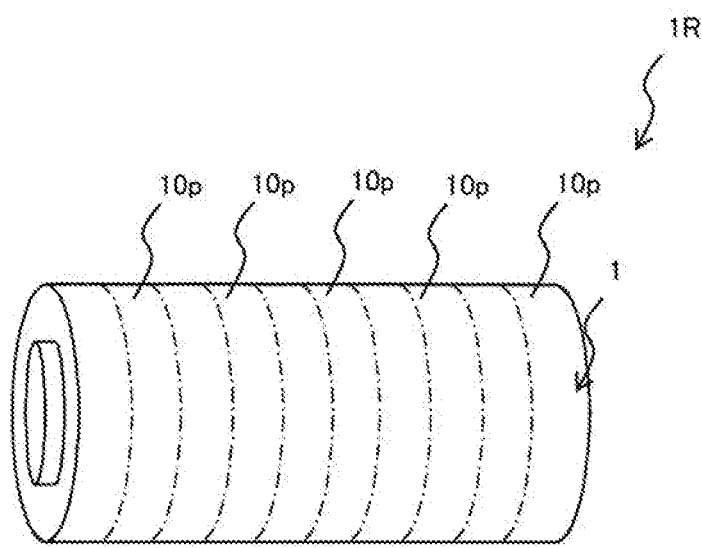
FIG. 1: A perspective view schematically showing the appearance of a metallized film roll obtained by winding a metallized film of Embodiment 1 in a roll shape.

FIG. 1 is a perspective view schematically showing the appearance of a metallized film roll obtained by winding the metallized film of Embodiment 1 in a roll shape. The metallized film 1 is used for the production of a metallized film capacitor. The metallized film 1 is produced as a metallized film roll 1R wound in a roll shape, as shown in FIG. 1. The metallized film roll 1R has a film width corresponding to 10 capacitor elements (length in the film width direction). The present embodiment shows a case where n in the present invention is 10; however, this is an example, and n may be an even number of 2 or more in present invention. In the metallized film 1, 10 rows of metallized film portions 10p each having a film width corresponding to one capacitor element (hereinafter referred to as "element width metallized film portions 10p") are formed. In the present specification, the terms "wind" and "wind up" are used, and these terms can also be used as "wind around."

Figure 2:
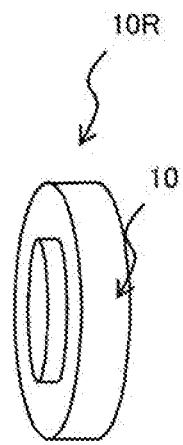
FIG. 2: A perspective view schematically showing the appearance of a metallized film roll obtained by winding, in a roll shape, a metallized film of Embodiment 1 having a film width corresponding to one capacitor element.

FIG. 2 is a perspective view schematically showing the appearance of a metallized film roll 10R obtained by winding, in a roll shape, a metallized film 10 of Embodiment 1 having a film width corresponding to one capacitor element. The metallized film 10 having a film width corresponding to one capacitor element and the metallized film roll 10R are hereinafter referred to as "element width metallized film 10" and "element width metallized film roll 10R," respectively, as appropriate.

The element width metallized film 10 is obtained by supplying the metallized film 1 from the metallized film roll 1R in a slit step, described later, and cutting the film with a film width corresponding to one capacitor element. The element width metallized film 10 obtained by cutting is wound to thereby form the metallized film roll 10R. The element width is not particularly limited, but is preferably, for example, 5 to 500 mm. Further, the winding length of the element width metallized film 10 is not particularly limited, but is preferably, for example, 1,000 to 100,000 m. The width of the metallized film 1 with a full width is not particularly limited, but is preferably, for example, a width obtained by multiplying the element width by the number of rows. The winding length of the metallized film 1 with a full width is not particularly limited, but is preferably, for example, about the same as the winding length of the element width metallized film 10.

Figure 3:
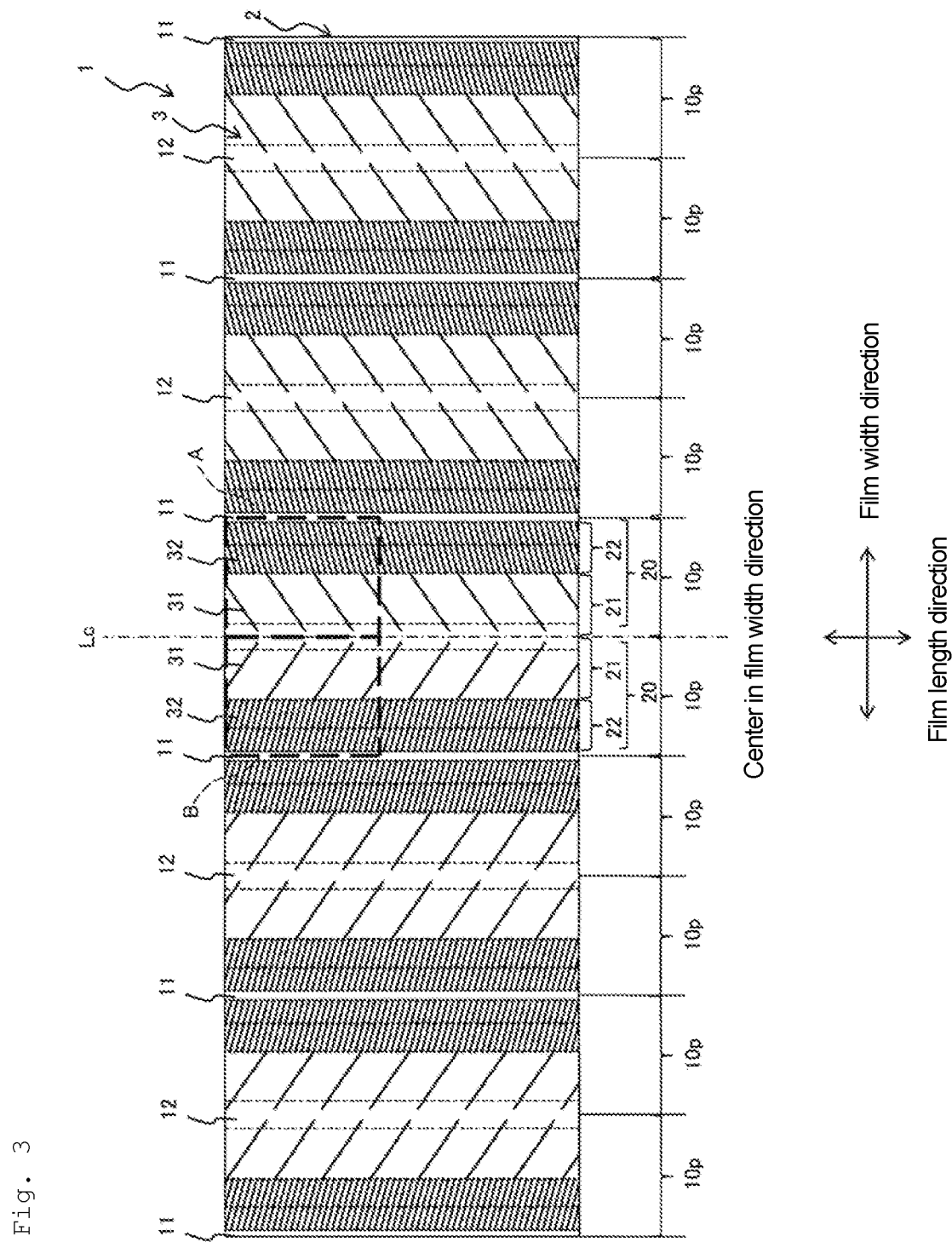
FIG. 3: A plan view showing the structure of the metallized film of Embodiment 1.

FIG. 3 is a plan view showing the structure of the metallized film 1 of Embodiment 1. In the metallized film 1, 10 electrode portions 20 (metal deposition portions) are formed by depositing metal in the form of thin films in parallel on one surface of a dielectric film 2 having a film width corresponding to 10 capacitor elements. These electrode portions 20 are collectively referred to as "metal deposition electrode 3," as appropriate. An insulation margin 11 or an electrode extraction portion 12, both extending linearly in the film length direction, is provided at each boundary between the adjacent element width metallized film portions 10p. The insulation margins 11 and margins described later are non-metal deposition portions. In the present invention and the present specification, the "metal deposition portion" is an area in which metal is deposited. Further, the "non-metal deposition portion" is an area other than the metal deposition portion, i.e., an area in which metal is not deposited. This area is also referred to as "metal non-deposition portion" or "non-deposition portion." The electrode extraction portion 12 is an area to which a metallikon electrode can be joined in a capacitor element formed using the element width metallized film 10. In the metallized film 1 of FIG. 3, the black-line regions shown in FIG. 3 are metal non-deposition portions, and the white regions shown in FIG. 3 are metal deposition portions.

The resin component constituting the dielectric film 2 (resin component contained in the dielectric film 2) is not particularly limited. Examples include polypropylene (PP), polyethylene terephthalate (PET), polyphenylene sulfide (PPS), polyethylene naphthalate (PEN), polyvinylidene difluoride (PVDF), polycarbonate (PC), polyetherimide (PEI), polystyrene (PS), polysulfone (PSU), polyether sulfone (PES or PESU), polyphenylsulfone (PPSU), poly ether ether ketone (PEEK), cycloolefin polymer (COP), cycloolefin copolymer (COC), and other resins that have insulating properties. Examples of polystyrene include isotactic polystyrene (IPS), syndiotactic polystyrene (SPS), and atactic polystyrene (APS). In particular, when the main component of the dielectric film 2 is polypropylene, step formation is likely to occur due to the influence of expansion and contraction caused by the reception of heat; thus, the metallized film of Embodiment 1 is highly effective to suppress step formation. Therefore, it is a preferable embodiment that the main component of the dielectric film 2 is polypropylene. The main component of the dielectric film 2 refers to, among all of the components constituting the dielectric film 2, a component that is contained in an amount of 50 mass % or more. The content of the resin component in the dielectric film 2 is preferably 70 mass % or more of the dielectric film 2, more preferably 80 mass % or more of the dielectric film 2, and even more preferably 90 mass % or more of the dielectric film 2. The content of the resin component in the dielectric film 2 may be 100 mass % or less of the dielectric film 2. The resin component contained in the dielectric film 2 may be a single type or a combination of two or more types.

The dielectric film 2 may contain additives, in addition to the resin component mentioned above. Examples of additives include antioxidants, chlorine absorbers, ultraviolet absorbers, lubricants, plasticizers, flame retardants, antistatic agents, colorants, and the like.

The thickness of the dielectric film 2 is preferably 0.5 to 25 μm, more preferably 0.7 to 10 μm, even more preferably 0.8 to 6.0 μm, still more preferably 1.0 to 3.0 μm, and particularly preferably 1.5 to 2.9 μm. In particular, when the dielectric film 2 has a thickness of 0.8 to 6.0 μm (more preferably 1.0 to 3.0 μm, even more preferably 1.5 to 2.9 μm), steps are less likely to be formed on the winding body surface of the metallized film roll 1R obtained by forming a metal deposition electrode 3 (metal deposition film) on the dielectric film 2 and winding the film in a roll shape, and step formation (stretching of the film in stepped portions) is less likely to occur. Therefore, the quality of the metallized film roll 1R, and the quality of the metallized film 1 wound on the metallized film roll 1R can be improved, and their productivity can be improved. Moreover, because the quality of the metallized film 1 is improved, the quality of the element width metallized film 10 obtained by cutting the metallized film 1, and the quality of a capacitor produced using the element width metallized film 10 can also be improved. The thickness of the metallized film 1 is preferably 0.5 to 25 µm, more preferably 0.7 to 10 µm, even more preferably 0.8 to 6.2 µm, still more preferably 1.0 to 3.2 µm, and particularly preferably 1.5 to 3.1 µm, in relation to the thickness of the metal deposition electrode 3 (metal deposition film).

The material of the metal deposition electrode 3 is not particularly limited. For example, a metal material, such as aluminum (Al), zinc (Zn), tin (Sn), or copper (Cu), or an alloy thereof can be used. The thickness of the metal deposition electrode 3 (metal deposition film) is not particularly limited, but is preferably 1 to 200 nm. The electrode extraction portion 12 in the metal deposition electrode 3 has a heavy edge structure in order to strengthen the joint between the electrode extraction portion 12 and a metallikon electrode and to improve the electrical connection. The heavy edge structure is a structure in which the thickness of the metal deposition film of the electrode extraction portion 12 in the metal deposition electrode 3 is larger than the thickness of the metal deposition film of the portion other than the electrode extraction portion 12. For example, the thickness of the metal deposition film of the electrode extraction portion 12 is about 2 to 5 times the thickness of the metal deposition film of the portion other than the electrode extraction portion 12. Further, the thickness of the metal deposition electrode 3 may be set according to the specific resistance of the material of the metal deposition electrode 3 so as to obtain desired electrical characteristics.

Figure 4:
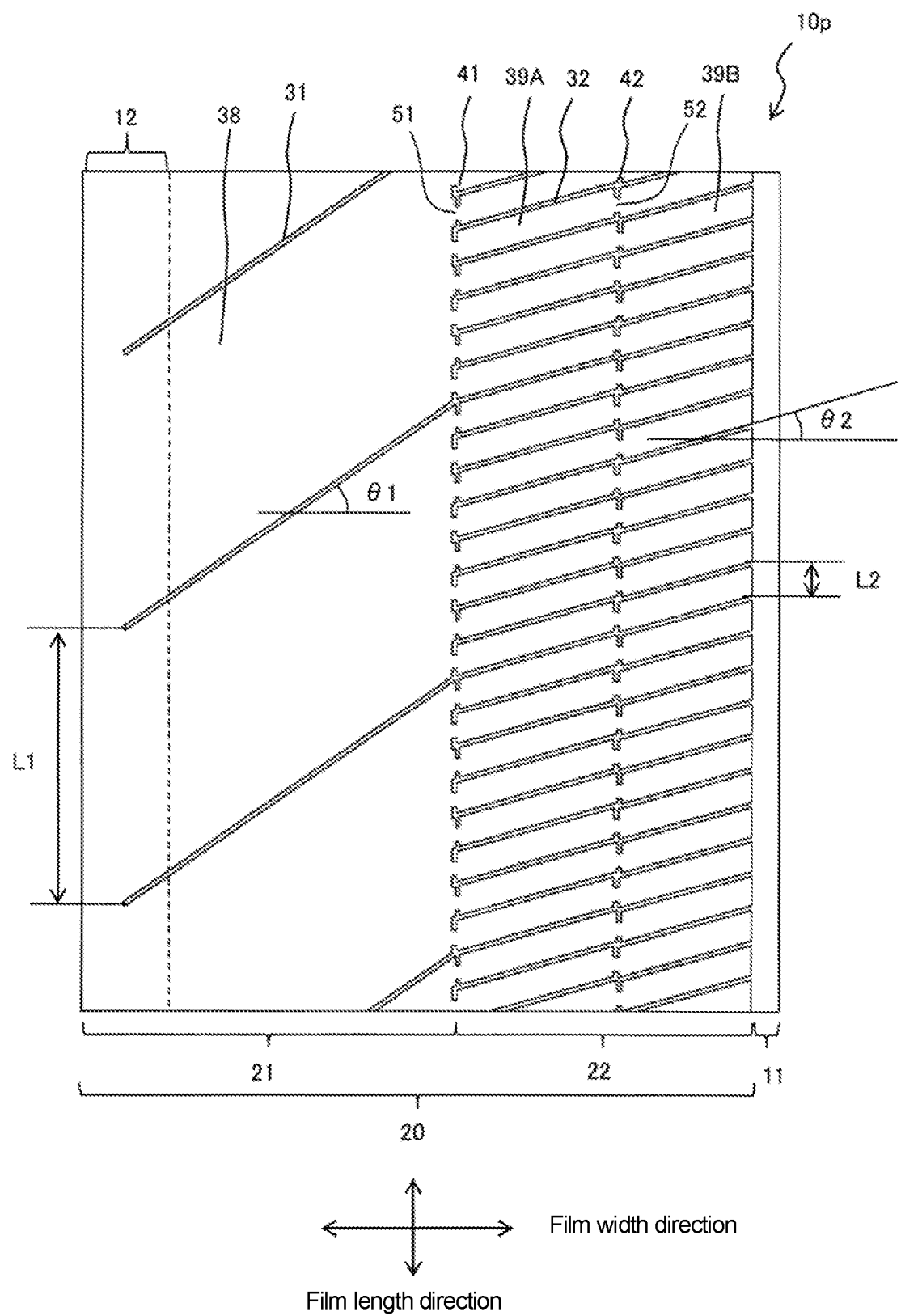
FIG. 4: An enlarged view of the area indicated by the dashed line A in FIG. 3.

FIG. 4 is an enlarged view of the area indicated by the dashed line A in FIG. 3. The insulation margin 11 extending in the film length direction described above is disposed at one end of the element width metallized film portion 10p in the film width direction, and the electrode extraction portion 12 extending in the film length direction described above is disposed at the other end in the film width direction. The element width metallized film portion 10p is preferably provided with a first vertical margin 41, a second vertical margin 42, a plurality of first inclined margins 31, and a plurality of second inclined margins 32. As the vertical margins, FIG. 4 shows two types of vertical margins, i.e., the first vertical margin 41 and the second vertical margin 42; however, the element width metallized film portion 10p may have the first vertical margin alone, or three or more types of vertical margins.

The first vertical margin 41 extends, for example, in the film length direction at approximately the center of the element width metallized film portion 10p in the film width direction.

The second vertical margin 42 extends, for example, in the film length direction in the vicinity of the middle between the first vertical margin 41 and the insulation margin 11 in the film width direction.

The first inclined margins 31 extend, for example, linearly between the first vertical margin 41 and the electrode extraction portion 12 at a first angle $\theta 1$ with respect to the film width direction. For example, the plurality of first inclined margins 31 are provided at a first interval L1 in the film length direction.

The second inclined margins 32 extend, for example, linearly between the first vertical margin 41 and the insulation margin 11 at a second angle $\theta 2$ with respect to the film width direction. For example, the plurality of second inclined margins 32 are provided at a second interval L2 in the film length direction.

The second interval L2 is preferably less than the first interval L1. Further, the second angle $\theta 2$ is preferably less than the first angle $\theta 1$. If the inclination of the second inclined margins 32 is similar to the inclination of the first inclined margins 31, the effect for step formation, described later, will be obtained more strongly. However, if the inclination of the second inclined margins 32 is larger, the effective electrode area in a split electrode portion 22 is reduced, and the capacity of the capacitor element is lowered. Therefore, the second angle $\theta 2$ of the second inclined margins 32 is set in consideration of the balance between the effect for step formation and the reduction of the effective electrode area. In contrast, since the number of the first inclined margins 31 is relatively smaller than that of the second inclined margins 32, the effective electrode area is less affected by the inclination of the first inclined margins 31. For this reason, the first inclined margins 31 are set at the first angle $\theta 1$, at which the maximum effect for suppressing step formation can be obtained.

The first vertical margin 41, the second vertical margin 42, the first inclined margins 31, and the second inclined margins 32 each preferably have a width of 50 to 300 µm (more preferably 100 to 200 µm).

Due to the various margins described above, a large electrode portion 21 is formed on the electrode extraction portion 12 side of the first vertical margin 41 in the element width metallized film portion 10p, and a split electrode portion 22 having a plurality of first split electrodes 39A and second split electrodes 39B is partitioned and formed on the insulation margin 11 side of the first vertical margin 41. The electrode extraction portion 12 is an area to which a metallikon electrode, described later, can be joined in the large electrode portion 21. In the present embodiment, due to the first inclined margins 31 provided in the large electrode portion 21, the large electrode portion 21 is also divided into a plurality of electrodes 38 in a state in which a metallikon electrode is joined. In a film capacitor element 61, metallized films 10 (10A) and 10 (10B) having a substantially element width, as shown in FIG. 16(a) or FIG. 16(b), are wound in an overlapping state in which their insulation margins 11 are positioned on opposite sides in the film width direction, as shown in FIG. 16(c) or FIG. 16(d), whereby a safety mechanism is also configured in the large electrode portion 21. Since the first interval L1, which is the arrangement interval of the first inclined margins 31, is larger than the second interval L2, which is the arrangement interval of the second inclined margins 32, the size (area) of the electrode 38 obtained by division is larger than the size (area) of the first split electrode 39A and the second split electrode 39B.

On the first vertical margin 41, a plurality of first fuses 51 are provided to electrically connect the first split electrodes 39A and the large electrode portion 21. Each first fuse 51 is an electric passage made of evaporated metal and connecting the first split electrode 39A and the large electrode portion 21, and is vaporized by an electric current that flows through the first fuse 51 when an insulation defect occurs in the first split electrode 39A. The first split electrode 39A with the insulation defect is thereby electrically separated from the adjacent large electrode portion 21.

On the second vertical margin 42, a plurality of second fuses 52 are provided to electrically connect the first split electrodes 39A and the second split electrodes 39B. Each second fuse 52 is an electric passage made of evaporated metal and connecting each first split electrode 39A and each second split electrode 39B, and is vaporized by an electric current that flows through the second fuse 52 when an insulation defect occurs in the second split electrode 39B. The second split electrode 39B with the insulation defect is thereby electrically separated from the adjacent first split electrode 39A.

Further, in the present embodiment, the first vertical margin 41 and the second vertical margin 42 are each preferably staggered in the film width direction for each of the first split electrodes 39A and extend in a zigzag pattern so as not to be in a straight line in the film length direction. The length of one first split electrode 39A in the film length direction is an example of the predetermined length.

More specifically, the first vertical margin 41 on the side of each first split electrode 39A is formed in a different position in the film width direction with respect to the first vertical margin 41 on the side of an adjacent first split electrode 39A in the film length direction, but is formed in the same position in the film width direction with respect to the first vertical margin 41 on the side of a further adjacent first split electrode 39A. That is, the first vertical margin 41 is formed in the same position in the film width direction, alternating with the first split electrodes 39A.

Further, the second vertical margin 42 on the side of each first split electrode 39A is formed in a different position in the film width direction with respect to the first vertical margin 41 on the side of an adjacent first split electrode 39A in the film length direction, but is formed in the same position in the film width direction with respect to the second vertical margin 42 on the side of a further adjacent first split electrode 39A. That is, the second vertical margin 42 is formed in the same position in the film width direction, alternating with the first split electrodes 39A.

Returning to FIG. 3, in the metal deposition electrode 3 described above, across a center line Lc virtually extending in the film length direction at the center in the film width direction, the inclined margins 31 and 32 of the electrode portion 20 located on one side in the film width direction, and the inclined margins 31 and 32 of the electrode portion 20 located on the other side in the film width direction are inclined in opposite directions so as to be line-symmetric with respect to the center line Lc.

2. Method for Producing Metallized Film

Figure 5:
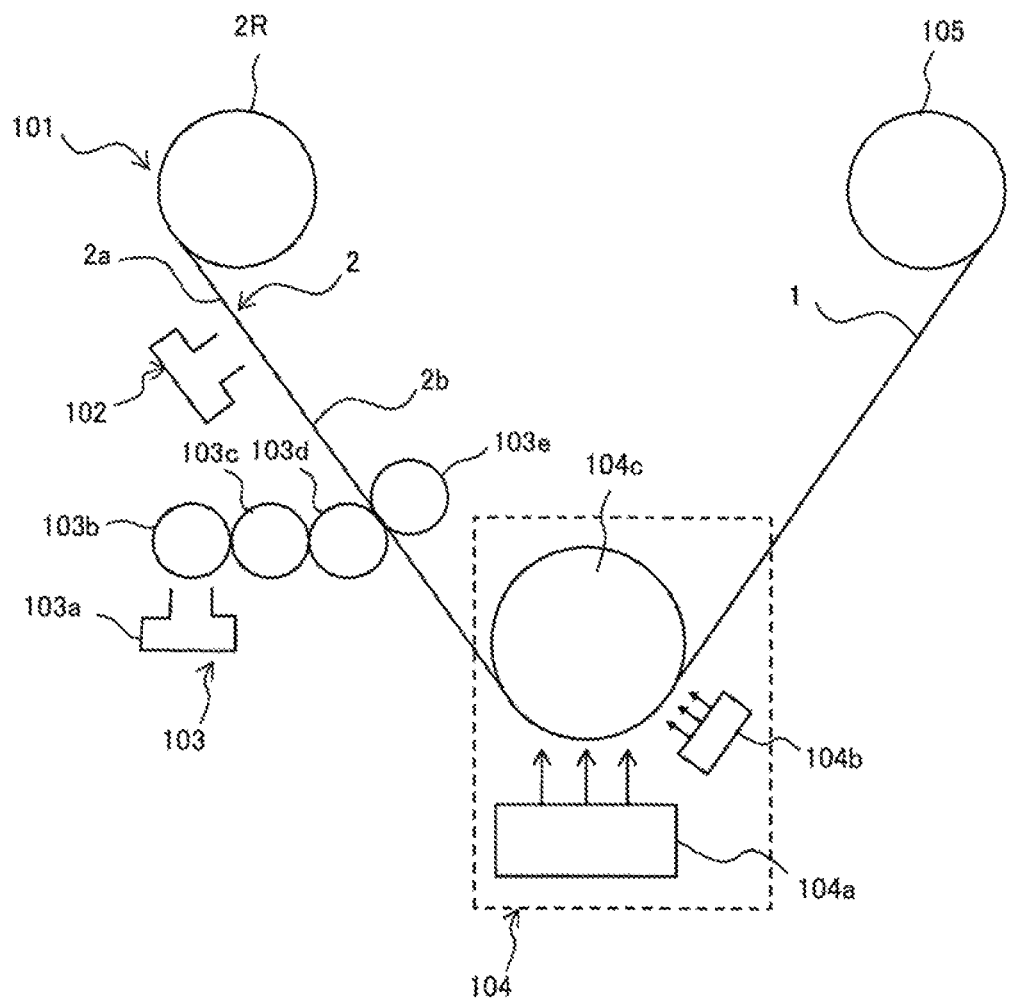
FIG. 5: A view explaining a method for producing a metallized film.

FIG. 5 is a view explaining a method for producing the metallized film 1. The production apparatus comprises a dielectric film supply portion 101, an insulation margin forming portion 102, a pattern forming portion 103, a deposition portion 104, and a winding roll 105.

The dielectric film supply portion 101 supports a dielectric film roll 2R obtained by winding a dielectric film 2, and supplies the dielectric film 2. The dielectric film 2 supplied from the dielectric film roll 2R is conveyed to the insulation margin forming portion 102.

The insulation margin forming portion 102 applies oil in a pattern corresponding to the pattern of the insulation margin 11 to the surface 2a of the dielectric film 2 to form an oil mask. The oil mask is provided to prevent, in the deposition process, metal particles from adhering to the portions serving as the insulation margins in the metallized film 1. The insulation margin forming portion 102 vaporizes oil stored in an oil tank and directly applies the vaporized oil to one surface 2a of the dielectric film 2 from a nozzle (slit) provided in the tank to form an oil mask.

The pattern forming portion 103 applies oil to the surface 2a of the dielectric film 2 in a pattern substantially corresponding to the electrode pattern of the metal deposition electrode 3 to form an oil mask. The oil mask is provided to prevent, in the deposition process, metal particles from adhering to the portions serving as the inclined margins and the vertical margins in the metallized film 1. The pattern forming portion 103 has an oil tank 103a, an anilox roll 103b, a transfer roll 103c, a plate roll 103d, and a backup roll 103e. The oil tank 103a vaporizes the stored oil and sprays it from a nozzle. The anilox roll 103b and the transfer roll 103c rotate in a state in which the oil sprayed from the nozzle of the oil tank 103a adheres to the outer peripheral surfaces of these rolls.

Figure 6:
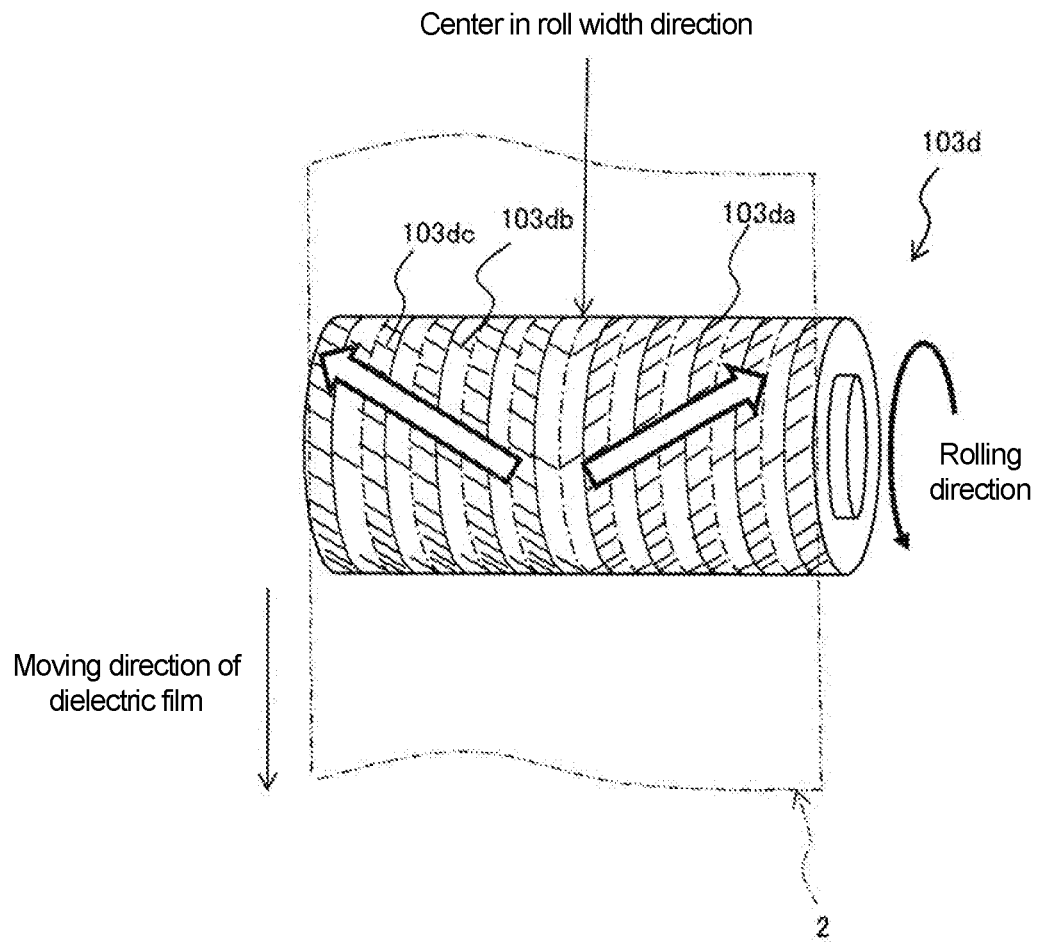
FIG. 6: A view showing the appearance of a plate roll used to produce a metallized film.

FIG. 6 is a view schematically showing the appearance of a plate roll used to produce a metallized film. The outer peripheral surface of the plate roll 103d is provided with letterpress portions 103da having a pattern shape corresponding to the electrode pattern of the metal deposition electrode 3. The plate roll 103d rotates in synchronization with the conveyance of the dielectric film 2, thereby applying oil in a pattern corresponding to the electrode pattern of the metal deposition electrode 3 to the surface 2a of the dielectric film 2 to form an oil mask. The pattern shape of the letterpress portions 103da of the plate roll 103d may be the same as the electrode pattern explained in FIG. 3. For example, the letterpress portions 103da are provided with inclined rib-shaped protrusions 103db and 103dc corresponding to the inclined margins 31 and 32.

Returning to FIG. 5, the backup roll 103e faces the plate roll 103d through the dielectric film 2 and abuts on the surface 2b of the dielectric film 2.

The dielectric film 2 that has passed through the insulation margin forming portion 102 and the pattern forming portion 103 is conveyed to the deposition portion 104.

The deposition portion 104 comprises metal vapor generating portions 104a and 104b, and a cooling roll 104c facing the metal vapor generating portions 104a and 104b through the dielectric film 2. The metal vapor generating portion 104a heats and vaporizes a metal having the same component as the material of the metal deposition electrode 3 to generate metal vapor, and deposits the generated metal vapor on the surface 2a of the dielectric film 2. The metal vapor generating portion 104b heats and vaporizes a metal having the same component as the material of the electrode extraction portion 12 to generate metal vapor, and deposits it on a large electrode portion 21 formed on the surface 2a of the dielectric film 2 by the metal vapor generating portion 104a. The metal deposition film of the electrode extraction portion 12 is thereby thicker than the metal deposition film of the other portion; accordingly, a heavy edge structure is formed. The metal vapor generated in the metal vapor generating portions 104a and 104b adheres to portions other than the oil mask formed on the surface 2a of the dielectric film 2 to thereby form an metal deposition electrode 3. The cooling roll 104c abuts on the dielectric film 2 to cool the dielectric film 2.

The metallized film 1 formed by forming the metal deposition electrode 3 on the dielectric film 2 in the deposition portion 104 is conveyed to and wound on the winding roll 105. After metal deposition, a coat layer may be provided on at least one surface (one surface or both surfaces) of the metallized film. The coat layer is, for example, a moisture-resistant coat layer.

In this way, a desired metal deposition electrode 3 can be formed on the surface 2a of the dielectric film 2 by the production method using the production apparatus of the embodiment. A metallized film 1 is thereby obtained.

The metallized film 1 may be stored in the form of a metallized film roll 1R wound in a roll shape, as shown in FIG. 1. The metallized film roll 1R may or may not have a winding core (core). The metallized film roll 1R preferably has a winding core (core). The material of the winding core of the metallized film roll 1R is not particularly limited. Examples of the material include paper (paper tube), resin, fiber-reinforced plastic (FRP), metal, and the like. Examples of the resin include polyvinyl chloride, polyethylene, polypropylene, phenol resin, epoxy resin, acrylonitrile-butadiene-styrene copolymer, and the like. Examples of plastic constituting fiber-reinforced plastic include polyester resin, epoxy resin, vinyl ester resin, phenol resin, thermoplastic resin, and the like. Examples of fibers constituting fiber-reinforced plastic include glass fibers, aramid fibers (Kevlar (registered trademark) fibers), carbon fibers, polyparaphenylene benzoxazole fibers (Zylon (registered trademark) fibers), polyethylene fibers, boron fibers, and the like. Examples of the metal include iron, aluminum, stainless steel, and the like. The winding core of the metallized film roll 1R includes a winding core obtained by impregnating a paper tube with the resin mentioned above. In this case, the material of the winding core is classified as a resin.

3. Method for Producing Element Width Metallized Film 10

Figure 7:
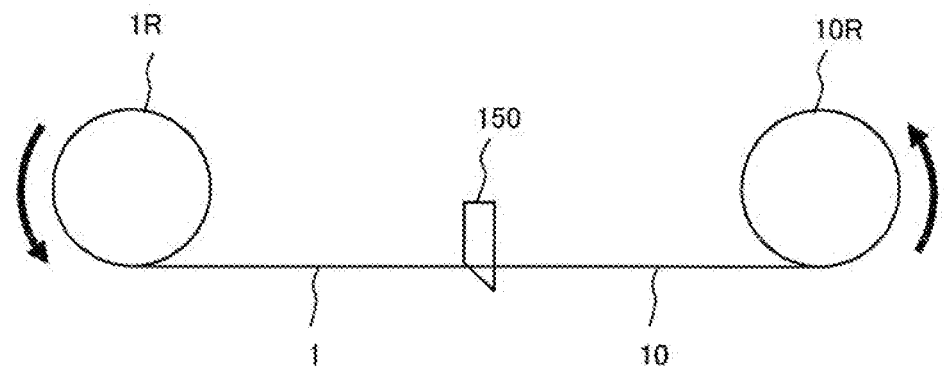
FIG. 7: A view showing a method for producing an element width metallized film.

FIG. 7 is a view showing a method for producing the element width metallized film 10. In the production of the element width metallized film 10, as shown in FIG. 7, the metallized film 1 is unwound from the metallized film roll 1R, and cut by a cutting blade 150 at the center between each insulation margin 11 and each electrode extraction portion 12 in the film width direction. The cutting may be performed linearly or non-linearly (e.g., in a wave shape). Then, a plurality of element width metallized films 10 obtained by cutting are each wound in a roll shape and produced as an element width metallized film roll 10R. In that case, since step formation is suppressed in the metallized film roll 1R, which is the material of the element width metallized film roll 10R, excellent quality can also be obtained for the element width metallized film roll 10R obtained from the metallized film roll 1R.

4. Comparative Example

Figure 8:
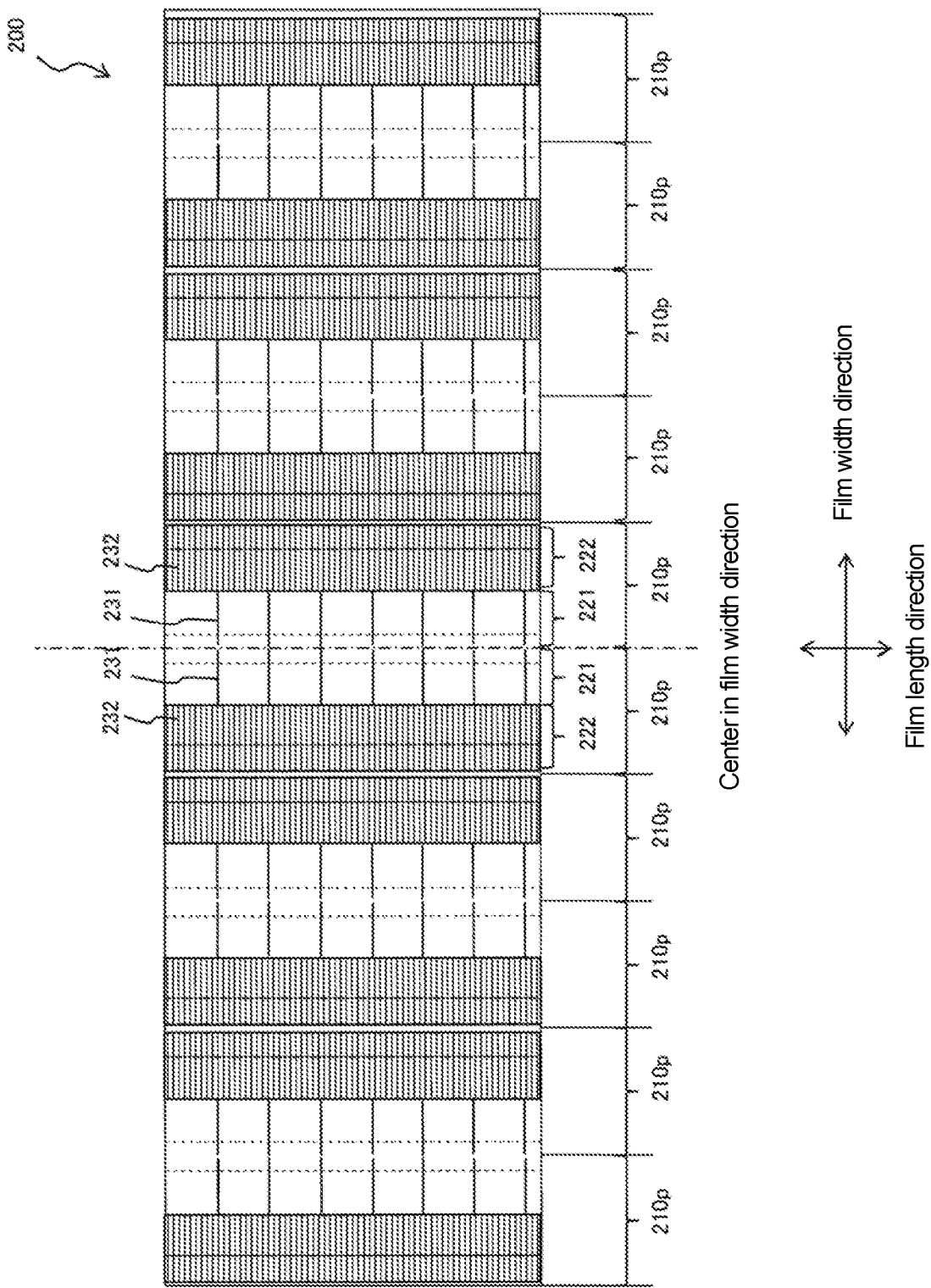
FIG. 8: A plan view showing the structure of a metallized film of a comparative example.

FIG. 8 is a plan view showing the structure of a metallized film of a comparative example. The metallized film 200 of the comparative example has 10 element width metallized film portions 210p, and each element width metallized film portion 210p has a large electrode portion 221 and a split electrode portion 222, as with the present embodiment. The difference is that horizontal margins 231 and 232 extending in parallel in the film width direction are provided, instead of the inclined margins 31 and 32 of the present embodiment.

Figure 9:
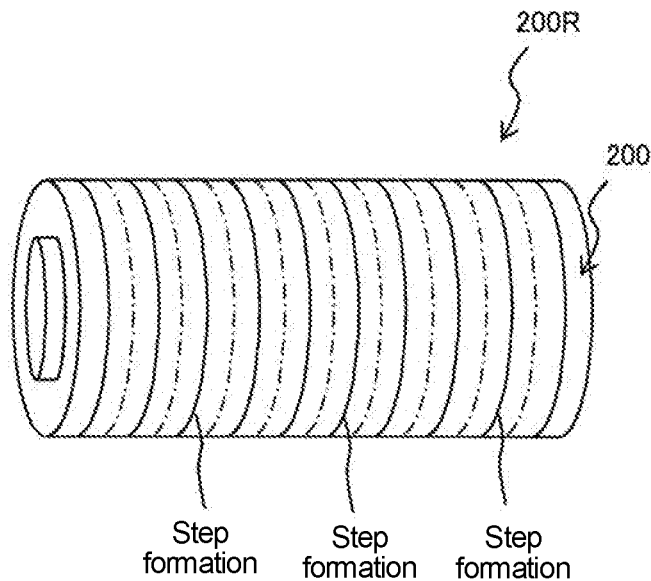
FIG. 9: A view explaining problems of the comparative example.

FIG. 9 is a view explaining problems of the comparative example. A metallized film roll 200R of the comparative example was produced by the same production method as that of the present embodiment explained in FIG. 5. As a matter of course, the pattern provided in the plate roll of the pattern forming portion varies according to the electrode pattern of FIG. 8. In the comparative example, when the dielectric film was thin (e.g., 1.0 to 3.0 µm, particularly 1.5 to 2.9 µm), step formation occurred on the body surface (outer peripheral surface) of the metallized film roll 200R along the vertical margins of the metallized film 200, as schematically shown in FIG. 9. Step formation means that the body surface (outer peripheral surface) of the produced metallized film roll dents in strips along the circumferential direction, so that steps are formed. Step formation is caused by a minute thickness difference between the metal non-deposition portion (particularly vertical margin) and the metal deposition portion in the metallized film. More specifically, step formation is considered to occur because the vertical margin portions, which have a locally thinner thickness in the metallized film 200, are wound and overlap in the same position in the film width direction. Since the metallized film 200 is stretched due to the steps in the stepped portions, it may cause wrinkles in the subsequent process or destruction of the metal deposition layer, depending on the degree of stretching. Accordingly, the electrical characteristics of the metallized film as a capacitor are deteriorated; therefore, it may not be used for the production of capacitors.

5. Effects of Present Embodiment

Figure 10:
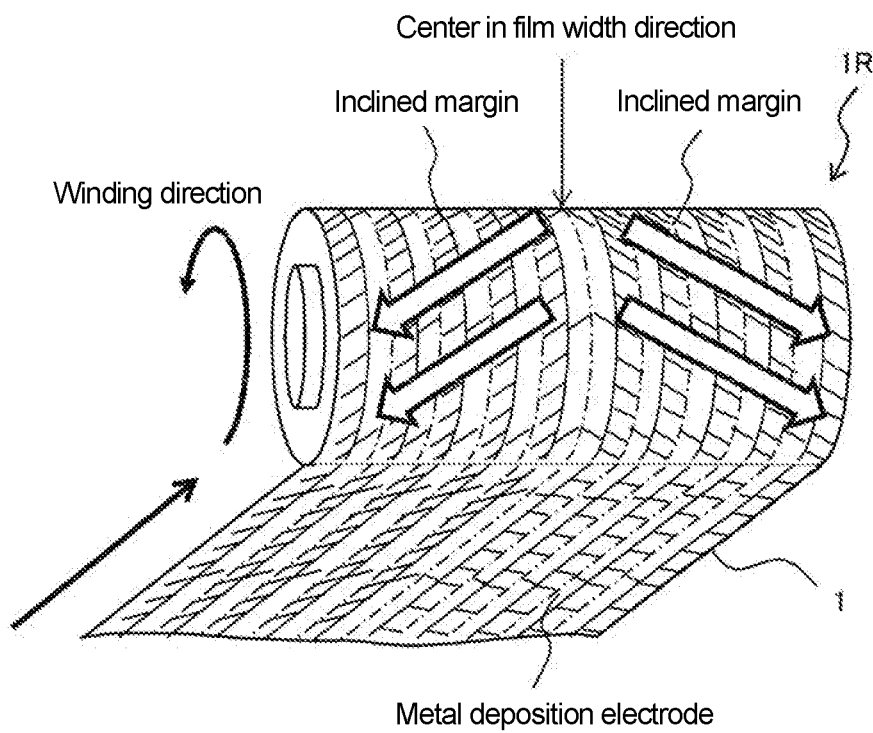
FIG. 10: A view explaining effects of Embodiment 1.

FIG. 10 is a view explaining effects of Embodiment 1. In the present embodiment, inclined margins (31 and 32) are provided symmetrically from the center of the metallized film 1 in the film width direction toward both ends. According to such a structure, the force applied to the metallized film 1, which is obtained by forming a metal deposition electrode (3) on a dielectric film 2, during winding of the metallized film 1 is likely to be dispersed in oblique directions, as indicated by the white arrows, along the inclined margins from the center in the film width direction to both end sides in the film width direction. This results in an effect of stretching the metallized film 1 to both end sides in the film width direction during winding of the metallized film 1. Accordingly, even if the thickness of the metallized film 1 (dielectric film 2) is reduced, steps are less likely to be formed on the winding body surface of the metallized film roll 1R, and step formation (stretching of the film in the stepped portions) is less likely to occur. Consequently, the quality of the metallized film roll 1R, and the quality of the metallized film 1 wound on the metallized film roll 1R can be improved, and their productivity can be improved. Moreover, because the quality of the metallized film 1 is improved, the quality of an element width metallized film 10 obtained by cutting the metallized film 1, and the quality of a capacitor produced using the element width metallized film 10 can also be improved.

Further, in the present embodiment, the first vertical margin 41 and the second vertical margin 42 are not formed in a straight line, but are staggered in a zigzag pattern, as described above; accordingly, the first vertical margins 41 are less likely to overlap with each other, and the second vertical margins 42 are less likely to overlap with each other, whereby step formation is much less likely to occur in the first vertical margin 41 portion and the second vertical margin 42 portion.

Moreover, in the present embodiment, when an oil mask is formed in the electrode pattern using the plate roll 103d while running the dielectric film 2, if the plate roll 103d rotates in the direction indicated by the arrow in FIG. 6, a force acts on the dielectric film 2 in the direction of stretching wrinkles in the moving dielectric film 2 from the center of the plate roll 103d in the width direction toward both ends by the rib-shaped protrusions 103db and 103dc, which form an oil mask for the inclined margins 31 and 32 in the letterpress portions 130da. Therefore, wrinkles are reduced in the dielectric film 2 during formation of an oil mask in the electrode pattern, and printability is improved.

The metallized film 1 may have, at one or both ends thereof, a region (also referred to as an ear or edge) assumed to be removed at a slit.

6. Capacitor Configured Using Element Width Metallized Film of Present Embodiment FIG. 11 is a perspective view schematically showing the appearance of a metallized film capacitor using the element width metallized film 10 of Embodiment 1.

Figure 11:
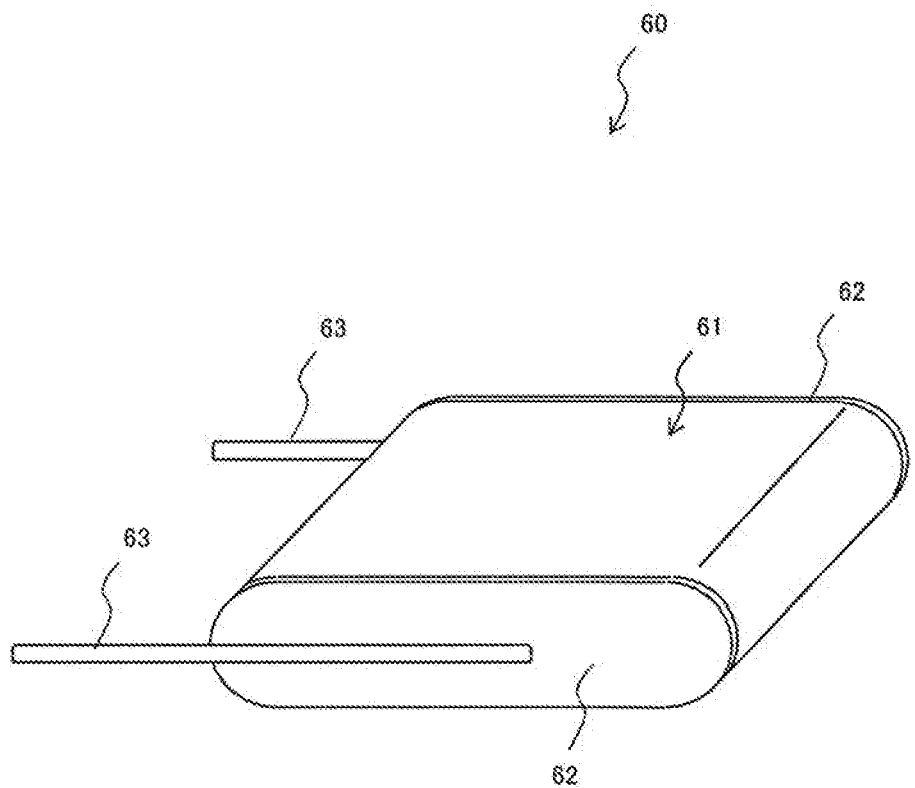
FIG. 11: A perspective view schematically showing the appearance of a metallized film capacitor element using the metallized film of Embodiment 1.

As shown in FIG. 11, the metallized film capacitor 60 comprises a capacitor element 61, a metallikon electrode 62, and a lead wire 63.

The capacitor element 61 is obtained by winding two overlapping element width metallized films 10, as described later. The capacitor element may be further pressed, as necessary.

In the production of a metallized film capacitor, the metallized film capacitor is generally produced by winding (winding up) two overlapping metallized films having a film width corresponding to approximately one element width. The width of one metallized film capacitor element is generally larger than the width of the metallized film, because (1) the two metallized films are wound while shifting them in the film width direction, and (2) a metallikon electrode is produced by metal spraying, as described later; accordingly, the thickness is increased by the thickness of the sprayed metal film.

The metallikon electrode 62 is formed by metal spraying at both ends of the capacitor element 61 in the film width direction, followed by thermal aging. Thermal aging is to thermally cure an element at a high temperature (e.g., 70 to 150° C.) under vacuum. Vacuum is applied because air remaining between the overlapping element width metallized films 10 wound in a roll shape is removed; accordingly, the element width metallized films 10 are not oxidized.

The lead wire 63 is connected to the metallikon electrode 62 formed as described above by, for example, soldering or welding.

Figure 12:
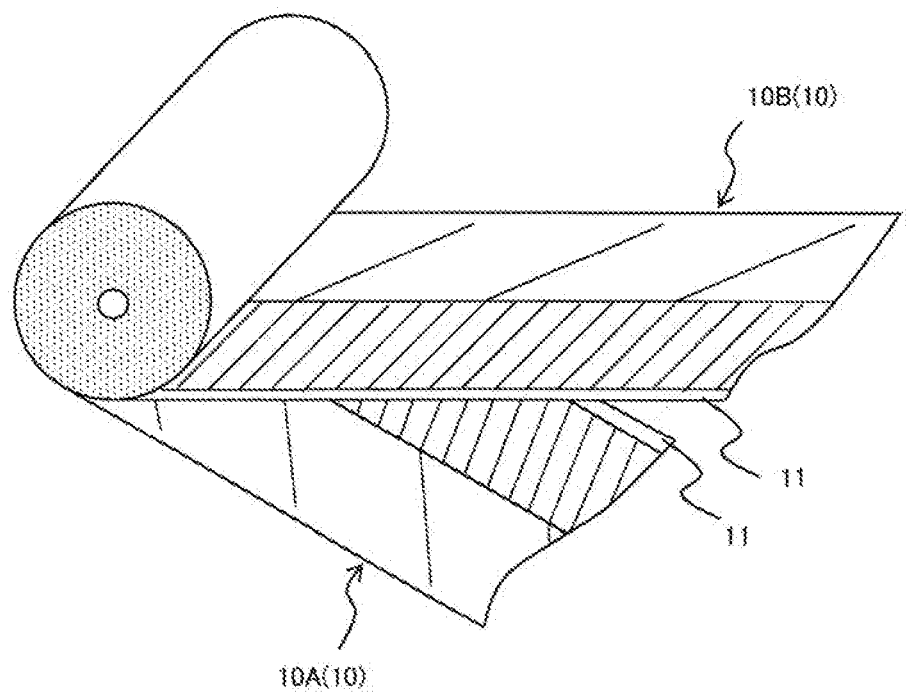
FIG. 12: A partially exploded perspective view of a capacitor obtained by winding the element width metallized film of Embodiment 1.
Figure 13:
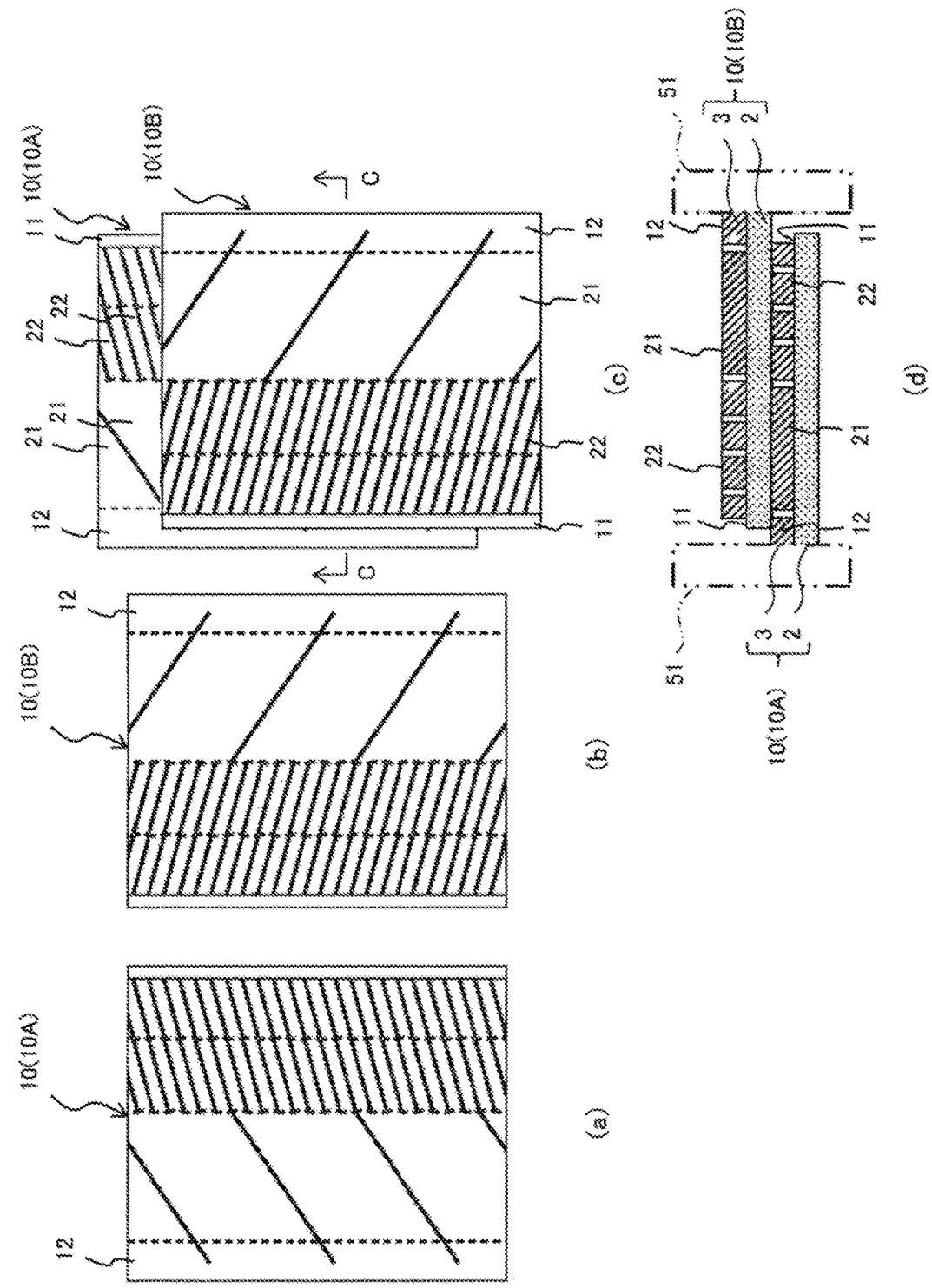
FIG. 13: A view schematically showing the structure of a metallized film capacitor using the element width metallized film of Embodiment 1. (a) is a plan view of a first element width metallized film, (b) is a plan view of a second element width metallized film, (c) is a plan view of the first element width metallized film and the second element width metallized film in an overlapping state, and (d) is a view schematically explaining the D-D cross section in (c).

FIG. 12 is a partially exploded perspective view of a capacitor element obtained by winding the element width metallized film 10 of Embodiment 1. FIG. 13 is a view schematically showing the structure of a metallized film capacitor using the element width metallized film 10 of Embodiment 1. (a) is a plan view of a first element width metallized film 10 (10A), (b) is a plan view of a second element width metallized film 10 (10B), (c) is a plan view of the first element width metallized film 10 (10A) and the second element width metallized film 10 (10B) in an overlapping state, and (d) is a view schematically explaining the C-C cross section in (c). Although the electrode extraction portion 12 has a heavy edge structure as described above, FIG. 13(d) is a schematic view and thus does not particularly show the thickness difference of the metal deposition films.

The first element width metallized film 10 (10A) in Fig. (a) corresponds to the area indicated by the dashed line A in the metallized film 1 of FIG. 3, and the second element width metallized film 10 (10B) in Fig (b) corresponds to the area indicated by the dashed line B in the metallized film 1 of FIG. 3. They have a symmetric structure, as described above.

The capacitor element 61 is formed by winding two element width metallized films 10 (10A) and 10 (10B) as shown in FIG. 13(a) and FIG. 13(b) in an overlapping state in which at least their insulation margins 11 are positioned on opposite sides in the film width direction, as shown in FIG. 12, FIG. 13(c), and FIG. 13(d). The two element width metallized films 10 (10A) and 10 (10B) may be wound while shifting them in the film width direction, as shown in FIG. 13(c) and FIG. 13(d), in order to secure an electrical insulation distance. The capacitor element 61 may remain in a wound shape, or may be flattened by pressing. According to this structure, the split electrode portion 22 of one element width metallized film 10 overlaps with the large electrode portion 21 of the other element width metallized film 10. Therefore, in a state in which two element width metallized films 10 overlap, a safety mechanism is configured by the split electrode portion 22 on the entire surface of the element width metallized film 10, and a metallized film capacitor 60 having excellent security is provided.

7. Summary

The present embodiment provides a metallized film 1 in which n electrode portions 20, which are metal deposition portions (obtained by depositing metal), are formed in parallel on at least one surface of a dielectric film 2 having a film width corresponding to n capacitor elements, n being an even number of 2 or more.

Each electrode portion 20 is provided with a plurality of inclined margins 31 and 32, which are metal non-deposition portions extending at an angle with respect to the film width direction, at a regular interval in the film length direction.

Across a center line Lc virtually extending in the film length direction at the center in the film width direction, the inclined margins 31 of the electrode portion 20 located on one side in the film width direction, and the inclined margins 32 of the electrode portion 20 located on the other side in the film width direction are inclined in opposite directions so as to be line-symmetric with respect to the center line Lc.

It is thereby possible to suppress step formation while reducing the thickness of the metallized film 1 having a multiple-element width.

Moreover, in the present embodiment, each electrode portion 20 is provided with a vertical margin 41, which is a metal non-deposition portion extending in the film length direction of the dielectric film 2.

Each electrode portion 20 is divided by the vertical margin 41 into a large electrode portion 21 (first electrode portion) and a split electrode portion 22 (second electrode portion) in the film width direction.

The large electrode portion 21 (first electrode portion) is provided with, as inclined margins, first inclined margins 31 extending at a first angle θ1 with respect to the film width direction at a first interval L1 in the film length direction.

The split electrode portion 22 (second electrode portion) is provided with, as inclined margins, second inclined margins 32 extending at a second angle θ2 with respect to the film width direction at a second interval L2 in the film length direction.

The second interval L2 is less than the first interval L1.

The second angle θ2 is less than the first angle θ1.

It is thereby possible to suppress step formation while further suppressing an increase in the area of the metal non-deposition portions in the electrode portion 20.

Moreover, in the present embodiment, the vertical margin 41 is staggered in the film width direction for every predetermined length so as not to be in a straight line in the film length direction.

Thereby, in the metallized film 1R obtained by winding the metallized film 1 in a roll shape, the vertical margin 41 portions do not overlap in a straight line. Therefore, it is possible to further suppress step formation in the vertical margin 41 portions.

Moreover, the present embodiment provides an element width metallized film 10 in which an electrode portion 20, which is a metal deposition portion, is formed on one surface of a dielectric film 2 having a film width corresponding to one capacitor element.

The electrode portion 20 is provided with a vertical margin 41, which is a metal non-deposition portion extending in the film length direction of the dielectric film 2.

The electrode portion 20 is divided by the vertical margin 41 into a large electrode portion 21 (first electrode portion) and a split electrode portion 22 (second electrode portion) in the film width direction.

The large electrode portion 21 (first electrode portion) is provided with first inclined margins 31, which are metal non-deposition portions extending at a first angle θ1 with respect to the film width direction, at a first interval L1 in the film length direction.

The split electrode portion 22 (second electrode portion) is provided with second inclined margins 32, which are metal non-deposition portions extending in a direction forming a second angle θ2 with respect to the film width direction, at a second interval L2 in the film length direction.

The second interval L2 is less than the first interval L1.

The second angle θ2 is less than the first angle θ1.

Moreover, the present embodiment provides a plate roll 103d used to form an oil mask for forming metal non-deposition portions in a metallized film 1 in which n electrode portions 20, which are metal deposition portions, are formed in parallel on at least one surface of a dielectric film 2 having a film width corresponding to n capacitor elements, n being an even number of 2 or more.

The metal non-deposition portions are a plurality of inclined margins 31 and 32 that extend at an angle with respect to the film width direction in each electrode portion 20, and that are provided at a regular interval in the film length direction.

Across a center line Lc virtually extending in the film length direction at the center in the film width direction, the inclined margins 31 and 32 of the electrode portion 20 located on one side in the film width direction, and the inclined margins 31 and 32 of the electrode portion 20 located on the other side in the film width direction are inclined in opposite directions so as to be line-symmetric with respect to the center line Lc.

On the outer peripheral surface of the plate roll 103d, letterpress portions 103da for forming an oil mask for the plurality of inclined margins 31 and 32 are provided at an interval in the circumferential direction.

The letterpress portions 103da are provided so as to be symmetric from the center in the roll width direction toward the left and right ends.

Thereby, when an oil mask is formed in the electrode pattern while running the dielectric film 2, a force acts on the dielectric film 2 in the direction of stretching wrinkles in the dielectric film 2 from the center of the plate roll 103d toward the ends. Therefore, wrinkles are reduced in the dielectric film 2 during formation of an oil mask in the electrode pattern, and printability is improved.

Embodiment 2

Embodiment 2 is described with reference to the drawings.

1. Structure of Metallized Film

Figure 14:
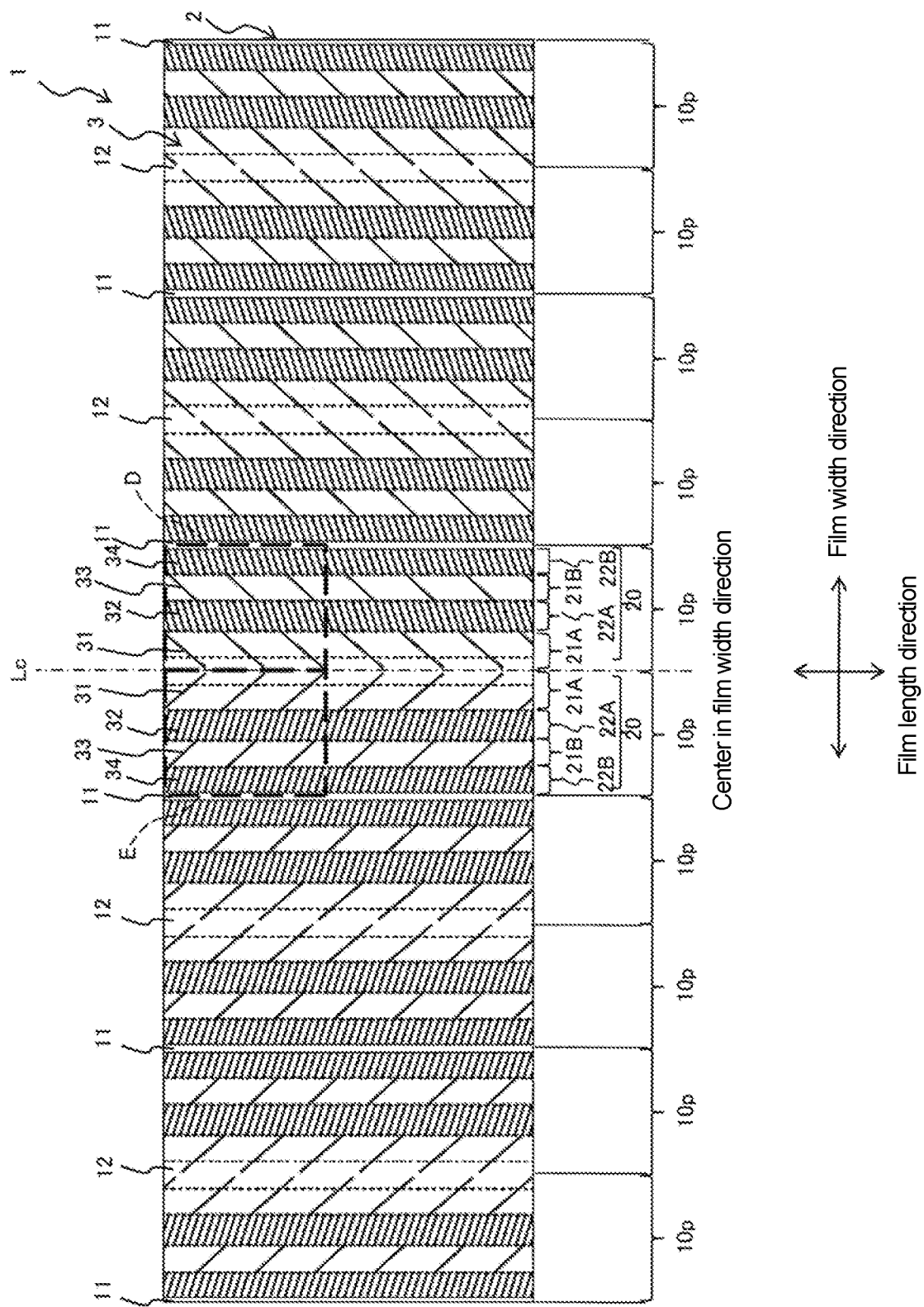
FIG. 14: A plan view showing the structure of a metallized film of Embodiment 2.
Figure 15:
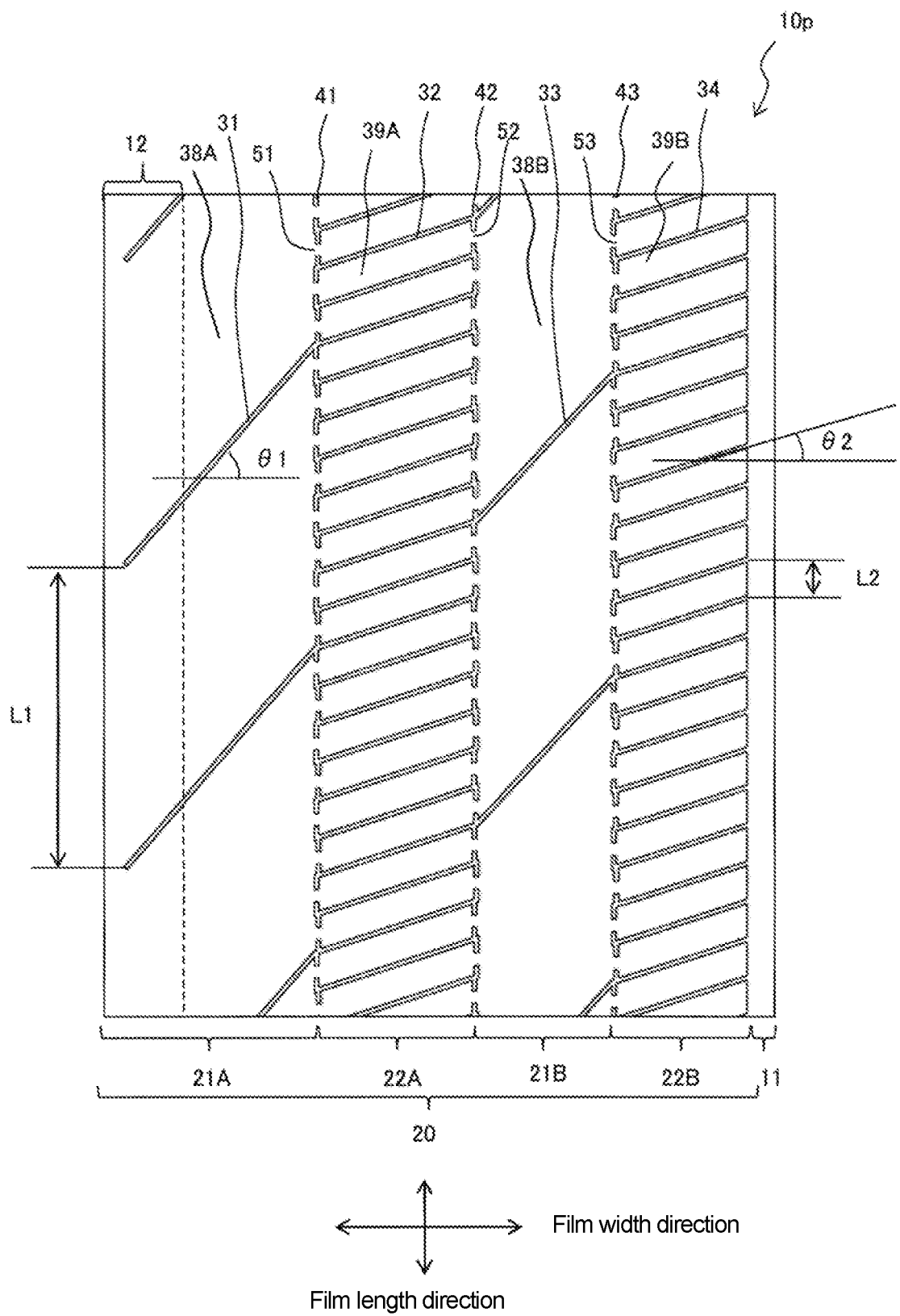
FIG. 15: An enlarged view of the area indicated by the dashed line D in FIG. 14.

FIG. 14 is a plan view showing the structure of a metallized film of Embodiment 2. FIG. 15 is an enlarged view of the area indicated by the dashed line D in FIG. 14.

In Embodiment 2, as shown in FIG. 14, element width metallized film portions 10p are each provided with two large electrode portions, i.e., a first large electrode portion 21A and a second large electrode portion 21B, and two split electrode portions, i.e., a first split electrode portion 22A and a second split electrode portion 22B, alternately in the film width direction. The differences from Embodiment 1 are mainly described in detail below.

As shown in FIG. 15, an insulation margin 11 and an electrode extraction portion 12 similar to those of Embodiment 1 are arranged at one end and the other end of the element width metallized film portion 10p of Embodiment 2 in the film width direction. The element width metallized film portion 10p is preferably provided with a first vertical margin 41, a second vertical margin 42, a third vertical margin 43, a plurality of first inclined margins 31, a plurality of second inclined margins 32, a plurality of third inclined margins 33, and a plurality of fourth inclined margins 34. As the vertical margins, FIG. 15 shows three types of vertical margins, i.e., the first vertical margin 41, the second vertical margin 42, and the third vertical margin 43; however, the element width metallized film portion 10p may have four or more types of vertical margins.

The insulation margin 11 extends linearly in the film length direction at one end of the element width metallized film portion 10p in the film width direction.

The first vertical margin 41 extends, for example, in the film length direction approximately in the middle between the second vertical margin 42 and the electrode extraction portion 12 in the film width direction.

The second vertical margin 42 extends, for example, in the film length direction at approximately the center of the element width metallized film portion 10p in the film width direction.

The third vertical margin 43 extends, for example, in the film length direction in the vicinity of the middle between the second vertical margin 42 and the insulation margin 11 in the film width direction.

The first inclined margins 31 extend, for example, linearly between the first vertical margin 41 and the electrode extraction portion 12 at a first angle θ1 with respect to the film width direction. For example, the plurality of first inclined margins 31 are provided at a first interval L1 in the film length direction.

The second inclined margins 32 extend, for example, linearly between the first vertical margin 41 and the second vertical margin 42 at a second angle θ2 with respect to the film width direction. For example, the plurality of second inclined margins 32 are provided at a second interval L2 in the film length direction. The second interval L2 is preferably less than the first interval L1. Further, the second angle θ2 is preferably set to be less than the first angle θ1.

The third inclined margins 33 extend, for example, linearly between the second vertical margin 42 and the third vertical margin 43 at the first angle θ1 with respect to the film width direction. For example, the plurality of third inclined margins 33 are provided at the first interval L1 in the film length direction.

The fourth inclined margins 34 extend, for example, linearly between the third vertical margin 43 and the insulation margin 11 at the second angle θ2 with respect to the film width direction. For example, the plurality of fourth inclined margins 34 are provided at the second interval L2 in the film length direction. The second interval L2 is preferably less than the first interval L1. Further, the second angle θ2 is preferably set to be less than the first angle θ1.

The first vertical margin 41, the second vertical margin 42, the third vertical margin 43, the first inclined margins 31, the second inclined margins 32, the third inclined margins 33, and the fourth inclined margins 34 each preferably have a width of 50 to 300 μm (more preferably 100 to 200 μm).

Due to the above various margins, a first large electrode portion 21A is formed on the electrode extraction portion 12 side of the first vertical margin 41 in the element width metallized film portion 10p, and a first split electrode portion 22A having a plurality of first split electrodes 39A is formed between the first vertical margin 41 and the second vertical margin 42. A second large electrode portion 21B is formed between the second vertical margin 42 and the third vertical margin 43. A second split electrode portion 22B having a plurality of second split electrodes 39B is formed on the insulation margin 11 side of the third vertical margin 43. The electrode extraction portion 12 is an area to which a metallikon electrode, described later, can be joined in the first large electrode portion 21A. In the present embodiment, due to the first inclined margins 31 provided in the first large electrode portion 21A, the first large electrode portion 21A is also divided into a plurality of electrodes 38A in a state in which a metallikon electrode is joined, and a safety mechanism is also configured in the first large electrode portion 21A. Further, due to the third inclined margins 33 provided in the second large electrode portion 21B, the second large electrode portion 21B is also divided into a plurality of electrodes 38B, and a safety mechanism is also configured in the second large electrode portion 21B. Since the first interval L1, which is the arrangement interval of the first inclined margins 31 and the third inclined margins 33, is larger than the second interval L2, which is the arrangement interval of the second inclined margins 32 and the fourth inclined margins 34, the size (area) of the electrodes 38A and 38B obtained by division is larger than the size (area) of the first split electrode 39A and the second split electrode 39B.

On the first vertical margin 41, a plurality of first fuses 51 are provided to electrically connect the first large electrode portion 21A and the first split electrodes 39A. Each first fuse 51 is an electric passage made of evaporated metal and connecting the first large electrode portion 21A and the first split electrode 39A, and is vaporized by an electric current that flows when an insulation defect occurs in the first split electrode 39A. The first split electrode 39A with the insulation defect is thereby electrically separated from the adjacent first large electrode portion 21A.

On the second vertical margin 42, a plurality of second fuses 52 are provided to electrically connect the first split electrodes 39A and the second large electrode portion 21B. Each second fuse 52 is an electric passage made of evaporated metal and connecting the first split electrode 39A and the second large electrode portion 21B, and is vaporized by an electric current that flows when an insulation defect occurs in the first split electrode 39A. The first split electrode 39A with the insulation defect is thereby electrically separated from the adjacent second large electrode portion 21B.

On the third vertical margin 43, third fuses 53 are provided to electrically connect the second large electrode portion 21B and the second split electrodes 39B. Each third fuse 53 is an electric passage made of evaporated metal and connecting the second large electrode portion 21B and the second split electrode 39B, and is vaporized by an electric current that flows when an insulation defect occurs in the second split electrode 39B. The second split electrode 39B with the insulation defect is thereby electrically separated from the adjacent second large electrode portion 21B.

Further, in the present embodiment, the first vertical margin 41, the second vertical margin 42, and the third vertical margin 43 are each preferably staggered in the film width direction for each of the split electrodes 39A and 39B and extend in a zigzag pattern so as not to be in a straight line in the film length direction. This shape is the same as that of Embodiment 1, and a detailed explanation thereof is omitted.

Returning to FIG. 14, in the metal deposition electrode 3 described above, across a center line Lc virtually extending in the film length direction at the center in the film width direction, the inclined margins 31, 32, 33, and 34 in the electrode portion 20 located on one side in the film width direction, and the inclined margins 31, 32, 33, and 34 in the electrode portion 20 located on the other side in the film width direction are inclined in opposite directions so as to be line-symmetric with respect to the center line Lc.

The metallized film 1 of Embodiment 2 can be produced by the same production method as that of the metallized film 1 of Embodiment 1.

Figure 16:
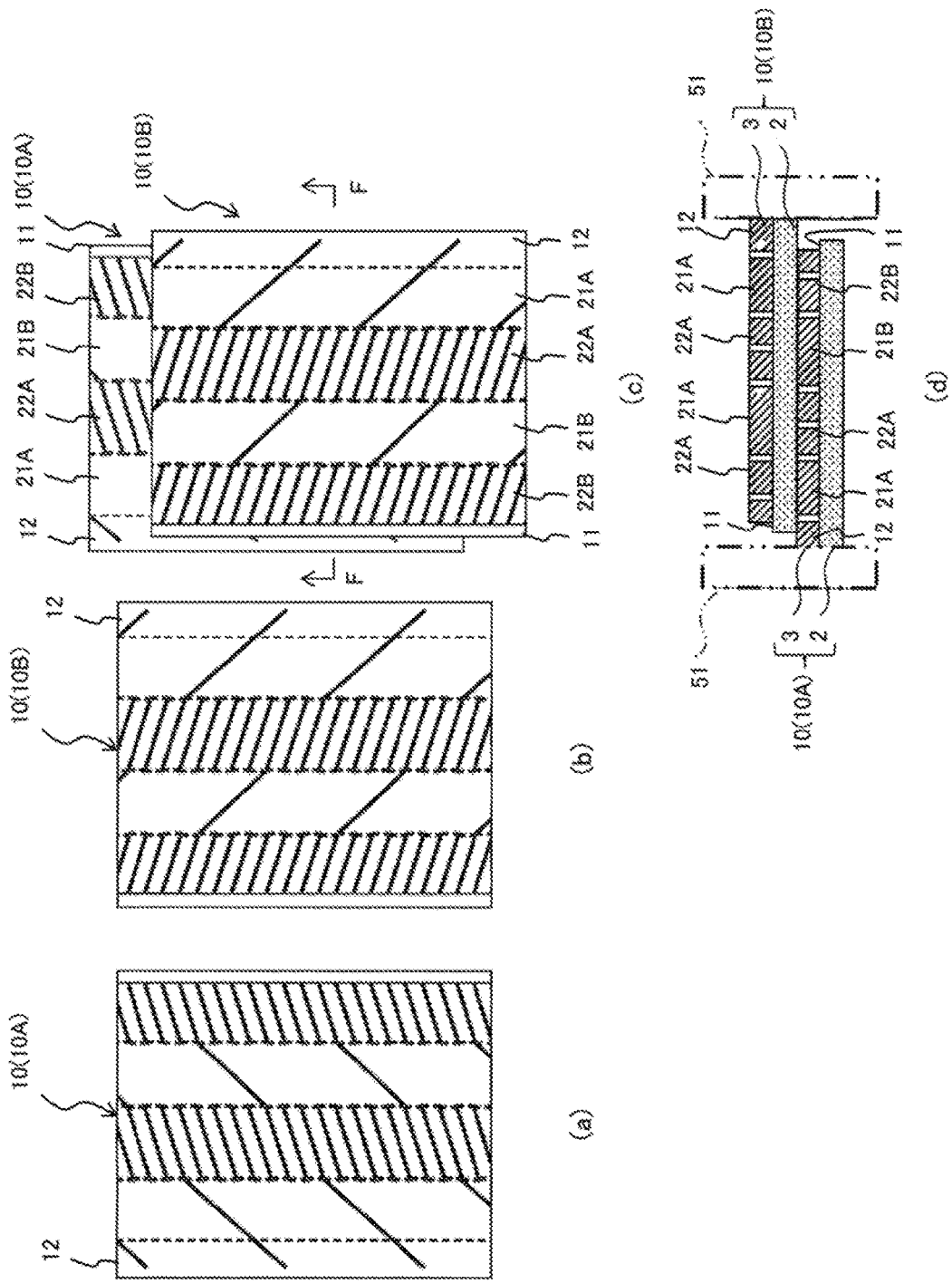
FIG. 16: A view schematically showing the structure of a metallized film capacitor using an element width metallized film of Embodiment 2. (a) is a plan view of a first element width metallized film, (b) is a plan view of a second element width metallized film, (c) is a plan view of the first element width metallized film and the second element width metallized film in an overlapping state, and (d) is a view schematically explaining the E-E cross section in (c).

FIG. 16 is a view schematically showing the structure of a metallized film capacitor using the element width metallized film 10 of Embodiment 2. (a) is a plan view of a first element width metallized film 10 (10A), (b) is a plan view of a second element width metallized film 10 (10B), (c) is a plan view of the first element width metallized film 10 (10A) and the second element width metallized film 10 (10B) in an overlapping state, and (d) is a view schematically explaining the F-F cross section in (c). Although the electrode extraction portion 12 has a heavy edge structure, as described above, FIG. 16(d) is a schematic view and thus does not particularly show the thickness difference of the metal deposition films.

The first element width metallized film 10 (10A) in Fig. (a) corresponds to the area indicated by the dashed line D in the metallized film 1 of FIG. 14, and the second element width metallized film 10 (10B) in Fig. (b) corresponds to the area indicated by the dashed line E in the metallized film 1 of FIG. 14. They have a symmetric structure, as described above.

The capacitor element 61 is formed by winding two element width metallized films 10 (10A) and 10 (10B) as shown in FIG. 16(a) and FIG. 16(b) in an overlapping state in which their insulation margins 11 are positioned on opposite sides in the film width direction, as shown in FIG. 16(c) and FIG. 16(d). The capacitor element 61 may be flattened. According to this structure, the first split electrode portion 22A and the second split electrode portion 22B of one element width metallized film 10 overlap with the first large electrode portion 21A and the second large electrode portion 21B of the other element width metalized film 10. Therefore, in a state in which the two element width metallized films 10 overlap, a safety mechanism is configured by the first split electrode portion 22A and the second split electrode portion 22B on the entire surface of the element width metallized film 10, and a capacitor having excellent security is provided.

2. Summary

In the present embodiment, each electrode portion 20 is provided with first, second, and third vertical margins 41, 42, and 43, which are metal non-deposition portions extending in the film length direction of the dielectric film 2, spaced apart from each other in the film width direction.

Each electrode portion 20 is divided by the first, second, and third vertical margins 41, 42, and 43 into a first large electrode portion 21A (first electrode portion), a first split electrode portion 22A (second electrode portion), a second large electrode portion 21B (third electrode portion), and a second split electrode portion 22B (second electrode portion) in the film width direction.

The first large electrode portion 21A (first electrode portion) is provided with, as inclined margins, first inclined margins 31 extending at a first angle θ1 with respect to the film width direction at a first interval L1 in the film length direction.

The first split electrode portion 22A (second electrode portion) is provided with, as inclined margins, second inclined margins 32 extending at a second angle θ2 with respect to the film width direction at a second interval L2 in the film length direction.

The second large electrode portion 21B (third electrode portion) is provided with, as inclined margins, third inclined margins 33 extending at the first angle θ1 with respect to the film width direction at the first interval L1 in the film length direction.

The second split electrode portion 22B (fourth electrode portion) is provided with, as inclined margins, fourth inclined margins 34 extending at the second angle θ2 with respect to the film width direction at the second interval L2 in the film length direction.

The second interval L2 is less than the first interval L1.

The second angle θ2 is less than the first angle θ1.

It is thereby possible to suppress step formation while further suppressing an increase in the area of the metal non-deposition portions in the electrode portion 20.

Moreover, the present embodiment provides an element width metallized film 10 in which an electrode portion 20, which is a metal deposition portion, is formed on one surface of a dielectric film 2 having a film width corresponding to one capacitor element.

The electrode portion 20 is provided with first, second, and third vertical margins 41, 42, and 43, which are metal non-deposition portions extending in the film length direction of the dielectric film 2, spaced apart from each other in the film width direction.

The electrode portion 20 is divided by the vertical margin 41 into a first large electrode portion 21A (first electrode portion), a first split electrode portion 22A (second electrode portion), a second large electrode portion 21B (third electrode portion), and a second split electrode portion 22B (second electrode portion) in the film width direction.

The first large electrode portion 21A (first electrode portion) is provided with first inclined margins 31, which are metal non-deposition portions extending at a first angle θ1 with respect to the film width direction, at a first interval L1 in the film length direction.

The first split electrode portion 22A (second electrode portion) is provided with second inclined margins 32, which are metal non-deposition portions extending in the direction forming a second angle θ2 with respect to the film width direction, at a second interval L2 in the film length direction.

The second large electrode portion 21B (third electrode portion) is provided with third inclined margins 33, which are metal non-deposition portions extending at the first angle θ1 with respect to the film width direction, at the first interval L1 in the film length direction.

The second split electrode portion 22B (fourth electrode portion) is provided with fourth inclined margins 34, which are metal non-deposition portions extending in the direction forming the second angle θ2 with respect to the film width direction, at the second interval L2 in the film length direction.

The second interval L2 is less than the first interval L1.

The second angle θ2 is less than the first angle θ1.

Other Embodiments

In Embodiments 1 and 2, the metallized films have vertical margins. However, vertical margins are not essential for the metallized film of the invention according to claim 1. For example, a metallized film having a structure in which n electrode portions formed in parallel are each not divided into a first electrode portion and a second electrode portion (e.g., divided into a large electrode portion and a split electrode portion) in the film width direction, may not have vertical margins; however, the metallized film of the invention according to claim 1 can also be suitably used for such a metallized film. Further, for example, a metallized film having a structure in which n electrode portions formed in parallel are each divided into a first electrode portion and a second electrode portion (e.g., divided into a large electrode portion and a split electrode portion) in the film width direction, but a safety mechanism, such as a fuse, is not provided between the first electrode portion and the second electrode portion, may not have vertical margins; however, the metallized film of the invention according to claim 1 can also be suitably used for such a metallized film.

In Embodiments 1 and 2, the vertical margins are each staggered in the film width direction for every predetermined length and extend in a zigzag pattern so as not to be in a straight line in the film length direction. However, it is not essential for the metallized films of the inventions according to claims 1, 2, 4, 6, and 8 that each vertical margin has a zigzag shape. For example, the vertical margins may extend linearly in the film length direction.

In Embodiment 1, the element width metallized film and the metallized film both have a second vertical margin 42 that divides the split electrode portion into two in the film width direction. However, the second vertical margin 42 is not essential for the element width metallized film and metallized film of the present invention, and the split electrode portion may not be divided into two in the film width direction.

In Embodiments 1 and 2, the inclination of the inclined margins in the large electrode portion is different from the inclination of the inclined margins in the split electrode portion. However, in the metallized film of the invention according to claim 1, the inclination of the inclined margins in the large electrode portion may be the same as the inclination of the inclined margins in the split electrode portion.

In Embodiments 1 and 2, a heavy edge structure is provided at the center of the metallized film 1 (raw film) in the film width direction, and an insulation margin 11 is provided at the left and right ends in the film width direction. However, in the metallized film (raw film) of the invention according to claim 1, an insulation margin may be provided at the center of the metallized film (raw film) in the film width direction, and a heavy edge structure may be provided at the left and right ends in the film width direction. This structure can be realized by swapping the left and right parts across the center of the metallized film 1 (raw film) of FIG. 3 in the film width direction. Even in this structure, across a center line virtually extending in the film length direction at the center in the film width direction, the inclined margins of the electrode portion located on one side in the film width direction, and the inclined margins of the electrode located on the other side in the film width direction are inclined in opposite directions so as to be line-symmetric with respect to the center line.

In the metallized film 1 and element width metallized film 10 of Embodiments 1 and 2, electrode portions 20 are formed only on one surface of a dielectric film 2. However, in the metallized film of the present invention, electrode portions may be formed on both surfaces of a dielectric film. That is, the phrase "at least one surface" recited in claim 1 or item [1] above includes a case of "one surface" and a case of "both surfaces." That is, the present embodiment also includes a metallized film in which n electrode portions, which are metal deposition portions, are formed in parallel on both surfaces of a dielectric film having a film width corresponding to n capacitor elements, n being an even number of 2 or more; wherein each electrode portion is provided with a plurality of inclined margins, which are metal non-deposition portions extending at an angle with respect to a film width direction, at a regular interval in a film length direction; and across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line. Examples of the both-surface structure include a structure in which, on the surface (back surface) of the dielectric film opposite to the one surface, electrode portions having a shape paired with the electrode portions on the front surface are formed so that the pattern on the front surface and the pattern on the back surface form a capacitance across the dielectric film. For example, electrode portions having the same pattern as in FIG. 3 may be formed on the back surface of the dielectric film 2.

Figure 17:
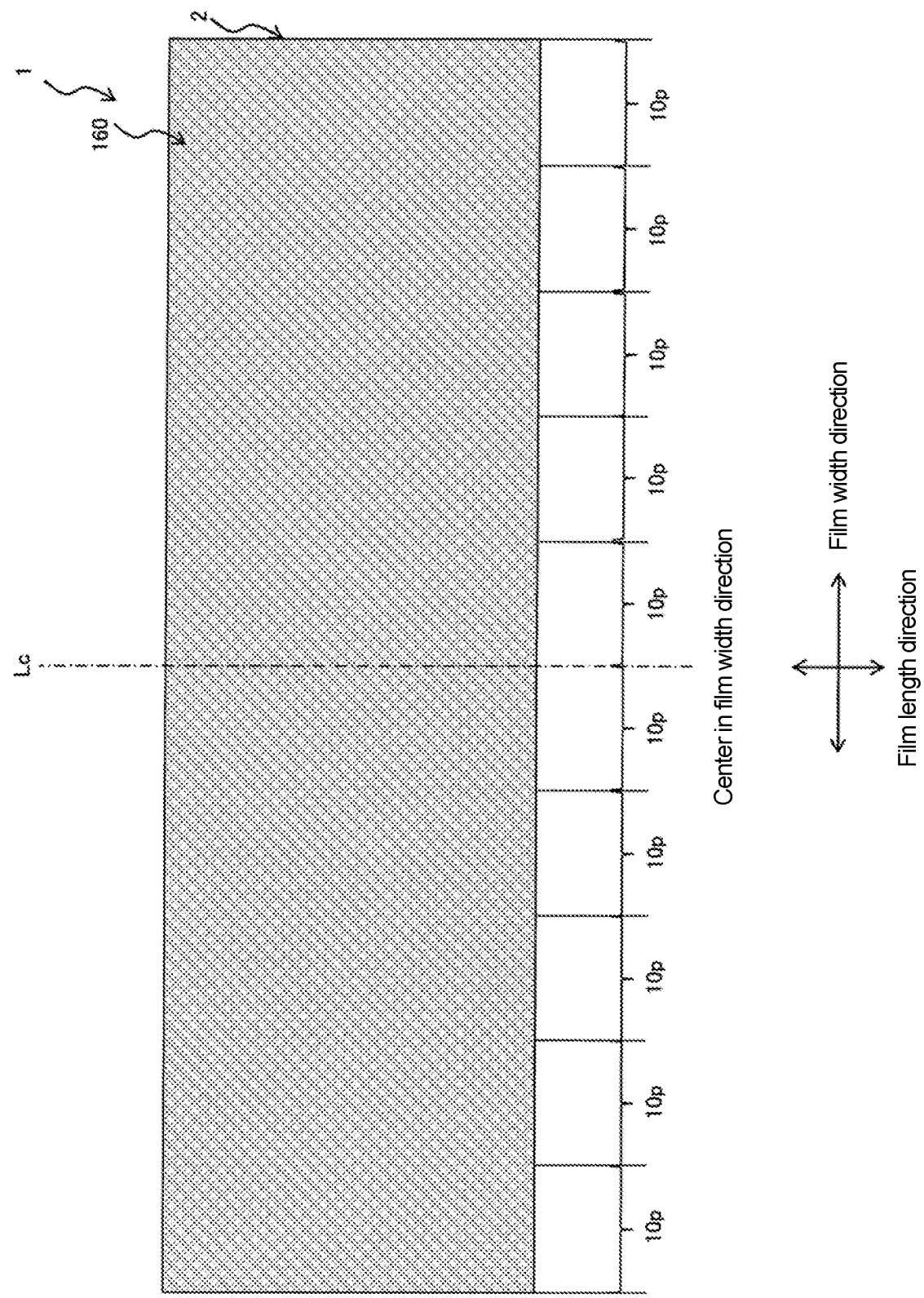
FIG. 17: A plan view showing the structure of a surface (back surface) opposite to the front surface of a metallized film of another embodiment.

Moreover, the metallized film of the present invention does not exclude an embodiment in which a metal layer (metal deposition layer) or the like is provided by solid-coating, instead of the electrode portions described above, on the entire surface (back surface) of the dielectric film opposite to the one surface. This embodiment is also included in the present embodiment. FIG. 17 is a view showing an example thereof. A metal layer 160 may be provided on the entire surface (back surface) of the dielectric film 2 of the metallized film 1 opposite to the one surface.

Figure 18:
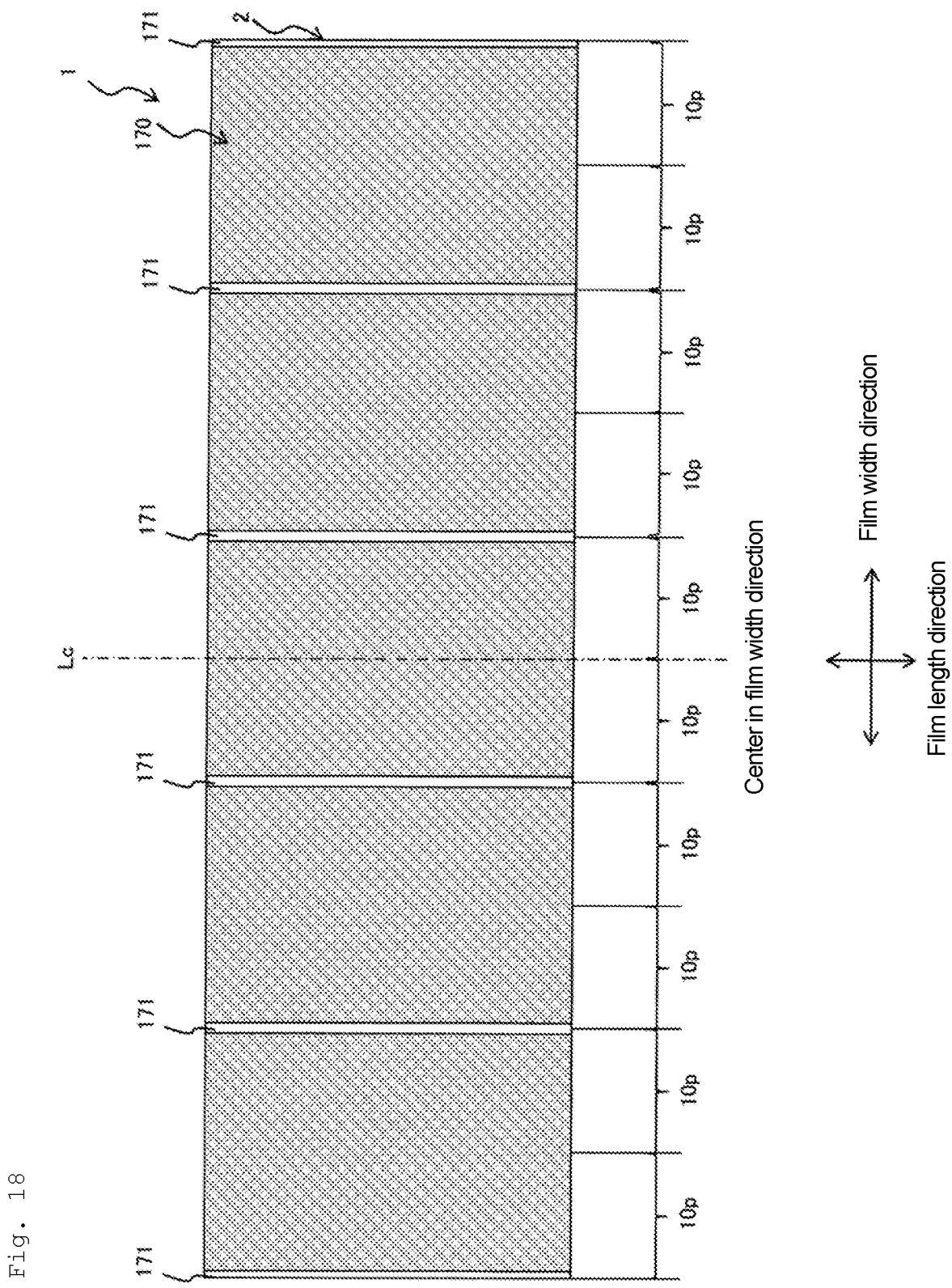
FIG. 18: A plan view showing the structure of a surface (back surface) opposite to the front surface of a metallized film of another embodiment.

Moreover, the metallized film of the present invention does not exclude an embodiment in which a metal layer (metal deposition layer) or the like is provided on the entire surface, other than the insulation margins, of the dielectric film opposite to the one surface. This embodiment is also included in the present embodiment. FIG. 18 is a view showing an example thereof. A metal layer 170 or the like may be provided on the entire surface (back surface), other than insulation margins 171, of the dielectric film 2 of the metallized film 1 opposite to the one surface. FIG. 18 shows an example in which the insulation margins 171 on the back surface are arranged at positions overlapping with the insulation margins 11 on the front surface (one surface) (see FIG. 3) in the film width direction; however, in the metallized film of the present invention, the positional relationship between the insulation margin and the electrode extraction portion regarding the front and back of the metallized film can be freely set.

Moreover, the metallized film of the present invention does not exclude an embodiment in which electrode portions having a shape different from that of n electrode portions formed on one surface of the dielectric film are formed on the other surface opposite to the one surface. This embodiment is also included in the present embodiment. In this case, the "electrode portions having a shape different from that of n electrode portions formed on one surface" may be, for example, electrode portions having the pattern shape of the comparative example shown in FIG. 8, or electrode portions having a known pattern shape.

Moreover, the metallized film of the present invention does not exclude an embodiment in which metal is not deposited on the other surface of the dielectric film opposite to the one surface. This embodiment is also included in the present embodiment.

In the present invention and the present specification, the surface of a metallized film on which electrode portions having a specific shape, which are a feature of the present embodiment, is referred to as "one surface" or "front surface" for convenience. Further, the surface opposite to the one surface is referred to as "the surface opposite to the front surface," "the other surface different from the one surface," "the surface on the back side," or simply "the back surface," for convenience.

INDUSTRIAL APPLICABILITY

The metallized film of the present invention can be used for various metallized film capacitors. The metallized film capacitors can be used for the following various applications. Specific examples include (1) mobile terminals (cell phones, portable music players, smartphones, tablet terminals, wearable devices, etc.), (2) PCs, (3) digital cameras, (4) home appliances (TVs, DVD recorders, refrigerators, washing machines, air conditioners, etc.), (5) car navigation, (6) power conditioners for power generation (solar, wind, etc.), (7) LED lighting, (8) automobiles (electric cars, hybrid cars, plug-in hybrid cars, etc.), (9) railway vehicles, (10) construction machinery, (11) industrial equipment, and (12) various other inverters. In particular, the metallized film of the present invention can be used for capacitors for use in automobiles and power applications, for which high-frequency characteristics are required.

REFERENCE SIGNS LIST

1. Metallized film
1R. Metallized film roll
2. Dielectric film
2a. Surface
2R. Dielectric film roll
3. Metal deposition electrode
10. Element width metallized film
11. Insulation margin
12. Electrode extraction portion
10p. Element width metallized film portion
10R. Element width metallized film roll
20. Electrode portion
21. Large electrode portion
22. Split electrode portion
31. First inclined margin
32. Second inclined margin
33. Third inclined margin
34. Fourth inclined margin
38. Electrode
38A. Electrode
38B. Electrode
41. First vertical margin
42. Second vertical margin
43. Third vertical margin 51. First fuse
52. Second fuse
53. Third fuse
39. Split electrode
60. Metallized film capacitor
61. Capacitor element
62. Metallikon electrode
63. Lead wire
101. Dielectric film supply portion
102. Insulation margin forming portion
103. Pattern forming portion
103*d*. Plate roll
104. Deposition portion
104*a*. Metal vapor generating portion
104*b*. Metal vapor generating portion (for forming electrode extraction portion)
104*c*. Cooling roll
105. Winding roll
150. Cutting blade
160. Metal layer
170. Metal layer
171. Insulation margin

The invention claimed is:

1. A metallized film in which n electrode portions, which are metal deposition portions, are formed in parallel in a film width direction on at least one surface of a dielectric film having a film width corresponding to n capacitor elements, n being an even number of 2 or more;
   wherein each electrode portion is provided with a plurality of inclined margins, which are metal non-deposition portions, at a regular interval in a film length direction,
   all of the inclined margins of each electrode portion extend at an angle with respect to the film width direction,
   the inclined margins are provided from the center in the film width direction toward both ends in the film width direction, and
   across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line.

2. A metallized film roll comprising the metallized film according to claim 1 in a roll shape.

3. A metallized film in which n electrode portions, which are metal deposition portions, are formed in parallel on at least one surface of a dielectric film having a film width corresponding to n capacitor elements, n being an even number of 2 or more;
   wherein each electrode portion is provided with a plurality of inclined margins, which are metal non-deposition portions extending at an angle with respect to a film width direction, at a regular interval in a film length direction,
   across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line,
   wherein each electrode portion is provided with a vertical margin, which is a metal non-deposition portion extending in the film length direction of the dielectric film,
   each electrode portion is divided by the vertical margin into a first electrode portion and a second electrode portion in the film width direction,
   the first electrode portion is provided with, as the inclined margins, first inclined margins extending at a first angle with respect to the film width direction at a first interval in the film length direction,
   the second electrode portion is provided with, as the inclined margins, second inclined margins extending at a second angle with respect to the film width direction at a second interval in the film length direction,
   the second interval is less than the first interval, and
   the second angle is less than the first angle.

4. The metallized film according to claim 3, wherein the vertical margin is staggered in the film width direction for every predetermined length so as not to be in a straight line in the film length direction.

5. A metallized film in which n electrode portions, which are metal deposition portions, are formed in parallel on at least one surface of a dielectric film having a film width corresponding to n capacitor elements, n being an even number of 2 or more;
   wherein each electrode portion is provided with a plurality of inclined margins, which are metal non-deposition portions extending at an angle with respect to a film width direction, at a regular interval in a film length direction,
   across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line,
   wherein each electrode portion is provided with first, second, and third vertical margins, which are metal non-deposition portions extending in the film length direction of the dielectric film, spaced apart in the film width direction,
   each electrode portion is divided by the first, second, and third vertical margins into first, second, third, and fourth electrode portions in the film width direction,
   the first electrode portion is provided with, as the inclined margins, first inclined margins extending at a first angle with respect to the film width direction at a first interval in the film length direction,
   the second electrode portion is provided with, as the inclined margins, second inclined margins extending at a second angle with respect to the film width direction at a second interval in the film length direction,
   the third electrode portion is provided with, as the inclined margins, third inclined margins extending at the first angle with respect to the film width direction at the first interval in the film length direction,
   the fourth electrode portion is provided with, as the inclined margins, fourth inclined margins extending at the second angle with respect to the film width direction at the second interval in the film length direction,
   the second interval is less than the first interval, and
   the second angle is less than the first angle.

6. The metallized film according to claim 5, wherein the vertical margins are each staggered in the film width direction for every predetermined length so as not to be in a straight line in the film length direction.

7. A metallized film in which an electrode portion, which is a metal deposition portion, is formed on at least one surface of a dielectric film having a film width corresponding to one capacitor element,
- wherein the electrode portion is provided with a vertical margin, which is a metal non-deposition portion extending in a film length direction of the dielectric film,
- the electrode portion is divided by the vertical margin into a first electrode portion and a second electrode portion in a film width direction,
- the first electrode portion is provided with first inclined margins, which are metal non-deposition portions extending at a first angle with respect to the film width direction, at a first interval in the film length direction,
- the second electrode portion is provided with second inclined margins, which are metal non-deposition portions extending at a second angle with respect to the film width direction, at a second interval in the film length direction,
- the second interval is less than the first interval, and
- the second angle is less than the first angle.

8. The metallized film according to claim 7, wherein the vertical margin is staggered in the film width direction for every predetermined length so as not to be in a straight line in the film length direction.

9. A metallized film in which an electrode portion, which is a metal deposition portion, is formed on at least one surface of a dielectric film having a film width corresponding to one capacitor element,
- wherein the electrode portion is provided with first, second, and third vertical margins, which are metal non-deposition portions extending in a film length direction of the dielectric film, spaced apart in the film width direction,
- the electrode portion is divided by the first, second, and third vertical margins into first, second, third, and fourth electrode portions in the film width direction,
- the first electrode portion is provided with first inclined margins, which are metal non-deposition portions extending at a first angle with respect to the film width direction, at a first interval in the film length direction,
- the second electrode portion is provided with second inclined margins, which are metal non-deposition portions extending at a second angle with respect to the film width direction, at a second interval in the film length direction,
- the third electrode portion is provided with third inclined margins, which are metal non-deposition portions extending at the first angle with respect to the film width direction, at the first interval in the film length direction,
- the fourth electrode portion is provided with fourth inclined margins, which are metal non-deposition portions extending at the second angle with respect to the film width direction, at the second interval in the film length direction,
- the second interval is less than the first interval, and
- the second angle is less than the first angle.

10. The metallized film according to claim 9, wherein the vertical margins are each staggered in the film width direction for every predetermined length so as not to be in a straight line in the film length direction.

11. A plate roll used to form an oil mask for forming metal non-deposition portions in a metallized film in which n electrode portions, which are metal deposition portions, are formed in parallel in a film width direction on at least one surface of a dielectric film having a film width corresponding to n capacitor elements, n being an even number of 2 or more,
- wherein the metal non-deposition portions are a plurality of inclined margins that are provided at a regular interval in a film length direction,
- all of the inclined margins of each electrode portion extend at an angle with respect to the film width direction,
- the inclined margins are provided from the center in the film width direction toward both ends in the film width direction,
- across a center line virtually extending in the film length direction at the center in the film width direction, the inclined margins of the electrode portion located on one side in the film width direction, and the inclined margins of the electrode portion located on the other side in the film width direction are inclined in opposite directions so as to be line-symmetric with respect to the center line,
- the plate roll has an outer peripheral surface provided with letterpress portions for forming an oil mask for the plurality of inclined margins at an interval in a circumferential direction, and
- the letterpress portions are provided so as to be symmetric from the center in a roll width direction toward left and right ends.

* * * * *